US011616551B2

(12) United States Patent
Großmann et al.

(10) Patent No.: US 11,616,551 B2
(45) Date of Patent: Mar. 28, 2023

(54) DOPPLER-DELAY CODEBOOK-BASED PRECODING AND CSI REPORTING WIRELESS COMMUNICATIONS SYSTEMS

(71) Applicant: Fraunhofer-Gesellschaft zur Förderung der angewandten Forschung e.V., Munich (DE)

(72) Inventors: Marcus Großmann, Erlangen (DE); Venkatesh Ramireddy, Erlangen (DE); Markus Landmann, Erlangen (DE); Sutharshun Varatharaajan, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 171 days.

(21) Appl. No.: 17/098,592

(22) Filed: Nov. 16, 2020

(65) Prior Publication Data

US 2021/0143885 A1    May 13, 2021

Related U.S. Application Data

(63) Continuation of application No. PCT/EP2019/064024, filed on May 29, 2019.

(30) Foreign Application Priority Data

May 30, 2018  (EP) .................................... 18175247

(51) Int. Cl.
*H04B 7/06* (2006.01)
*H04W 76/27* (2018.01)
*H04B 7/0456* (2017.01)

(52) U.S. Cl.
CPC ......... *H04B 7/0626* (2013.01); *H04B 7/0482* (2013.01); *H04B 7/0486* (2013.01);
(Continued)

(58) Field of Classification Search
CPC ................ H04B 7/0626; H04B 7/0482; H04B 7/0486; H04B 7/0617; H04B 7/0632;
(Continued)

(56) References Cited

U.S. PATENT DOCUMENTS 10,608,761 B2    3/2020    Astrom et al.
10,880,127 B2   12/2020    Zhang et al.
(Continued)

FOREIGN PATENT DOCUMENTS

EP          3 413 613 A1    12/2018
IN     CHE-2015-03728 A      1/2014
(Continued)

OTHER PUBLICATIONS

Indian language office action dated Dec. 31, 2021, issued in application No. IN 202037050535.
(Continued)

*Primary Examiner* — Minh Trang T Nguyen
(74) *Attorney, Agent, or Firm* — McClure, Qualey & Rodack, LLP

(57) ABSTRACT

A communication device for providing a channel state information, CSI, feedback in a wireless communication system includes a transceiver to receive, from a transmitter a radio signal via a time-variant, frequency-selective MIMO channel, the radio signal including downlink reference signals according to a reference signal configuration including a number of antenna ports, and downlink signals including the reference signal configuration; and a processor. The processor estimates an explicit CSI in the frequency domain using measurements on the downlink reference signals on
(Continued)

the radio channel, selects a Doppler-delay precoder matrix (W) for a composite Doppler-delay-beam three-stage precoder, calculates either one or more of a channel quality indicator, CQI, and/or a precoder matrix indicator, PMI, and/or a rank indicator, RI, and reports to the transmitter the CSI feedback including either one or more of the CQI, and/or the PMI and/or the RI.

46 Claims, 10 Drawing Sheets

(52) U.S. Cl.
CPC ......... *H04B 7/0617* (2013.01); *H04B 7/0632* (2013.01); *H04B 7/0634* (2013.01); *H04B 7/0639* (2013.01); *H04W 76/27* (2018.02)

(58) Field of Classification Search
CPC ................ H04B 7/0634; H04B 7/0639; H04B 7/0478; H04B 7/063; H04B 17/336; H04W 76/27; H04L 25/0222; H04L 25/024
See application file for complete search history.

(56) References Cited

U.S. PATENT DOCUMENTS

| | | | |
|---|---|---|---|
| 10,897,291 | B2 | 1/2021 | Zhang et al. |
| 11,239,887 | B2 | 2/2022 | Gao et al. |
| 2011/0250919 | A1 | 10/2011 | Barbieri et al. |
| 2014/0177745 | A1 | 6/2014 | Krishnamurthy et al. |
| 2016/0006122 | A1 | 1/2016 | Seol et al. |
| 2016/0087708 | A1 | 3/2016 | Kang et al. |
| 2018/0145809 | A1* | 5/2018 | Kwak .................... H04L 5/0048 |

FOREIGN PATENT DOCUMENTS

| | | |
|---|---|---|
| JP | 2016-40930 A | 3/2016 |
| JP | 2016-63497 A | 4/2016 |
| JP | 2017-163551 A | 9/2017 |
| JP | 2018-507572 A | 3/2018 |
| WO | 2014/182002 A1 | 11/2014 |
| WO | 2016068628 A1 | 5/2016 |
| WO | 2017/135295 A1 | 8/2017 |
| WO | 2017/152789 A1 | 9/2017 |
| WO | 2017/156732 A1 | 9/2017 |
| WO | 2017/166281 A1 | 10/2017 |
| WO | 2018052255 A1 | 3/2018 |

OTHER PUBLICATIONS

English language translation of office action dated Dec. 31, 2021, issued in application No. IN 202037050535.
Non-Final Office Action dated Apr. 27, 2022, issued in U.S. Appl. No. 17/447,013 (copy not provided).
Japanese language office action dated Feb. 8, 2022, issued in application No. JP 2020-567013.
English language translation of office action dated Feb. 8, 2022, issued in application No. JP 2020-567013 (pp. 1-16 of attachment).
3GPP TS 38.211 V15.1.0, 3rd Generation Partnership Project; Technical Specification Group Radio Access Network; NR; Physical channels and modulation (Release 15), Mar. 2018.
3GPP TS 38.214 V15.1.0, 3rd Generation Partnership Project; Technical Specification Group Radio Access Network; NR; Physical layer procedures for data (Release 15), Mar. 2018.
3GPP TS 38.331 V15.1.0, 3rd Generation Partnership Project; Technical Specification Group Radio Access Network; NR; Radio Resource Control (RRC); Protocol specification (Release 15), Mar. 2018.

K. Manolakis et al.: "Channel Prediction by Doppler-Delay Analysis and Benefits for Base Station Cooperation"; 77th IEEE Vehicular Technology Conference, Jun. 2013.
R. S. Thomä et al.: "RIMAX-A maximum likelihood framework for parameter estimation in multidimensional channel sounding"; Proceedings of the International Symposium on Antennas and Propagation (ISAP'04). 2004.
I. Barhumi et al.: "Optimal training design for MIMO OFDM systems in mobile wireless channels"; IEEE Trans. Signal Process, vol. 51, No. 6, pp. 1615-1624, Jun. 2003.
P. Hoeher et al.: "Two-dimensional pilot-symbol-aided channel estimation by Wiener filtering"; Proc. IEEE ICASSP-97, Munich, Germany, Apr. 1997, pp. 1845-1848.
Huawei: "Enhancements on CSI reporting and codebook design"; 3GPP Draft; R1-1808949, 3rd Generation Partnership Project (3GPP), Mobile Competence Centre, 650, Route Des Lucioles, F-06921 Sophia-Antipoli s Cedex, France, vol. RAN WG1, no. Gothenburg, Sweden; Aug. 20, 2018-Aug. 24, 2018, Aug. 11, 2018 (Aug. 11, 2018), XP051516324, Retrieved from the Internet: URL:http://www.3gpp.org/ftp/tsg%5Fran/WG1%5FRL1/TSGR1%5F94/Docs/R1%2D1808949%2Ezip.
Fraunhofer IIS: "Enhancements on Type-II CSI reporting" 3GPP Draft; R1-1813130, 3rd Generation Partnership Project (3GPP), Mobile Competence Centre, 650, Route Des Lucioles, F-06921 Sophia-Antipolis Cedex, France; vol. Ran WG1, no. Spokane, USA; Nov. 12, 2018-Nov. 16, 2018, Nov. 11, 2018 (Nov. 11, 2018), XP051555112, Retrieved from the Internet: URL:http://www.3gpp.org/ftp/Meetings%5F3GPP%5FSYNC/RAN1/Docs/R1%2D1813130%2Ezip.
Fraunhofer Iis: "Enhancements on Type-II CSI:Doppler Approach", 3GPP Draft; R1-1902124, 3rd Generation Partnership Project (3GPP), Mobile Competence Centre; 650, Route Des Lucioles ; F-06921 Sophia-Antipolis Cedex; France, vol. RAN WG1, no. Athens, GR; Feb. 25, 2019-Mar. 1, 2019; Feb. 15, 2019 (Feb. 15, 2019), XP051599819, Retrieved from the Internet: URL:http://www.3gpp.org/ftp/tsg%5Fran/WG1%5FRL1/TSGR1%5F96/Docs/R1%2D1902124%2Ezip.
Samsung: "Summary of CSI enhancement for MU-MIMO", 3GPP Draft; R1-1902304 R16 Summary MUCSI Final, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 25, 2019-Mar. 1, 2019, Feb. 26, 2019 (Feb. 26, 2019), XP051599998, Retrieved from the Internet: URL:http://www.3gpp.org/ftp/tsg%5Fran/WG1%5FRL1/TSGR1%5F96/Docs/R1%2D1902304%2Ezip.
V. Jungnickel et al.: "Backhaul requirements for inter-site cooperation in heterogeneous LTE-Advanced networks" 2013 IEEE International Conference on Commun i ca ti ons Workshops (ICC), IEEE, Jun. 9, 2013 (Jun. 9, 2013), pp. 905-910, XP032518656, DOI: 10.1109/ICCW.2013.6649363.
Interdigital Communications: "CSI Feedback for Non-uniform Networks", 3GPP Draft; R1-112240 IDCC CSI Feedback for Non-Uniform Networks, 3rd Generation Partnership Project (3GPP), Mobile Competence Centre; 650, Route Des Lucioles; F-06921 Sophia-Antipolis Cedex; France, vol. RAN WG1, no. Athens, Greece; Aug. 22, 2011, Aug. 16, 2011 (Aug. 16, 2011).
International Search Report, dated Sep. 20, 2019, from PCT EP/2019/064024.
NTT Docomo, Inc. (Rapporteur), RAN WG's progress on NR technology SI in the January adhoc meeting[online], 3GPP TSG-RAN WG2 #97 R2-1701059, Feb. 17, 2017.
JP Office Action dated Nov. 8, 2022 in application No. JP2020-567013.
Chinese language office action dated Dec. 27, 2022, issued in application No. CN 201980050859.4.

* cited by examiner

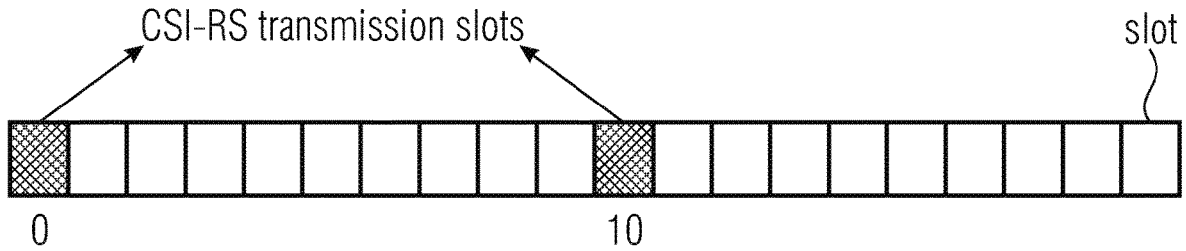
Fig. 5(a)
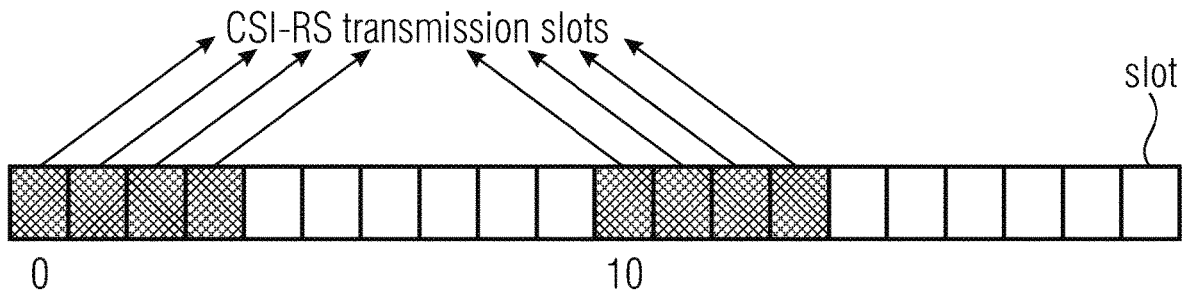
Fig. 5(b)
```
-- ASN1START
-- TAG-CSI-RS-BURSTDURATION-START
CSI-RS-BURSTDURATION : : = ENUMERATED {
    burstSlots0, burstSlots1, burstSlots2, burstSlots3,
burstSlots4, burstSlots5
}
-- TAG-CSI-RS-BURSTDURATION-STOP
-- ASN1STOP
```
Fig. 6

DOPPLER-DELAY CODEBOOK-BASED PRECODING AND CSI REPORTING WIRELESS COMMUNICATIONS SYSTEMS

CROSS-REFERENCES TO RELATED APPLICATIONS

This application is a continuation of copending International Application No. PCT/EP2019/064024, filed May 29, 2019, which is incorporated herein by reference in its entirety, and additionally claims priority from European Application No. EP 18175247.8, filed May 30, 2018, which is incorporated herein by reference in its entirety.

The present application concerns the field of wireless communications, more specifically to wireless communication systems employing precoding using Doppler-delay codebook-based precoding and channel state information, CSI, reporting.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$, and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication system like to one depicted schematically in FIG. 1, multi-antenna techniques may be used, e.g., in accordance with LTE or NR, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver. The precoder matrix to be used at the gNB to map the data to the transmit antenna ports is decided using channel state information, CSI.

In a communication system as described above, such as LTE or New Radio (5G), downlink signals convey data signals, control signals containing down link, DL, control information (DCI), and a number of reference signals or symbols (RS) used for different purposes. A gNodeB (or gNB or base station) transmits data and control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part, and used at the user equipment (UE) to obtain a channel estimate to demodulate the data or control information. The CSI-RS is transmitted with a reduced density in the time and frequency domain compared to CRS, and used at the UE for channel estimation/channel state information (CSI) acquisition. The DM-RS is transmitted only in a bandwidth part of the respective PDSCH and used by the UE for data demodulation. For signal precoding at the gNB, several CSI-RS reporting mechanism were introduced such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam-direction and beam-width. For beamformed/precoded UE-specific or non-UE-specific CSI-RS, a beam-forming operation is applied over a single- or multiple antenna ports to have several narrow beams with high gain in different directions and therefore, no cell-wide coverage.

In a wireless communication system employing time division duplexing, TDD, due to channel reciprocity, the channel state information (CSI) is available at the base station (gNB). However, when employing frequency division duplexing, FDD, due to the absence of channel reciprocity, the channel has to be estimated at the UE and feed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array $ANT_T$ having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array $ANT_R$ having a plurality of antennas or antenna elements. A feedback channel 216 between the user equipment 202 and the base station 200 is provided for transmitting feedback information. The previous releases of 3GPP up to Rel.15 support the use of several downlink reference symbols (such as CSI-RS) for CSI estimation at the UE. In FDD systems (up to Rel. 15), the estimated channel at the UE is reported to the gNB implicitly where the CSI transmitted by the UE over the feedback channel includes the rank index (RI), the precoding matrix index (PMI) and the channel quality index (CQI) (and the CRI from Rel. 13) allowing, at the gNB, deciding the precoding matrix, and the modulation order and coding scheme (MCS) of the symbols to be transmitted. The PMI and the RI are used to determine the precoding matrix from a predefined set of matrices $\Omega$ called 'codebook'. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNBs equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1N_2$ positions (in total $N_t=2N_1N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beam-forming weights (also referred to as the 'array steering vectors') of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to 'read' the codebook and obtain the precoder. The array steering vectors may be described by the columns of a 2D Discrete Fourier Transform (DFT) matrix when ULAs or UPAs are used for signal transmission.

The precoder matrices used in the Type-I and Type-II CSI reporting schemes in 3GPP New Radio Rel. 15 are defined in frequency-domain and have a dual-stage structure: $F(s)=F_1F_2(S)$, $s=0 \ldots, S-1$ (see reference [2]), where S denotes the number of subbands. The matrix $F_1$ is a wide-band matrix, independent on index s, and contains U spatial beamforming vectors (the so-called spatial beams) $b_u \in \mathbb{C}^{N_1N_2 \times 1}$, $u=1, \ldots, U$ selected out of a DFT-codebook matrix, $$F_1 = \begin{bmatrix} b_1, \ldots, b_U & 0 \ldots 0 \\ 0 \ldots 0 & b_1, \ldots, b_U \end{bmatrix} \in \mathbb{C}^{2N_1N_2 \times 2U}.$$

The matrix $F_2(s)$, is a selection/combining/co-phasing matrix that selects/combines/co-phases the beams defined in $F_1$ for the s-th configured sub-band.

For example, for a rank-1 transmission and Type-I CSI reporting, $F_2(s)$ is given for a dual-polarized antenna array by [2]

$$F_2(s) = \begin{bmatrix} e_u \\ e^{j\delta_1} e_u \end{bmatrix} \in \mathbb{C}^{2U \times 1},$$

where $e_u \in \mathbb{C}^{U \times 1}$, $u=1, 2, \ldots, U$ contains zeros at all positions, except the u-th position which is one. Such a definition of $e_u$ selects the u-th vector for each polarization of the antenna array, and combines them across both polarizations. Furthermore, $\delta_1$ is a quantized phase adjustment for the second polarization of the antenna array.

For example, for a rank-1 transmission and Type-II CSI reporting, $F_2(s)$ is given for dual-polarized antenna arrays by [2]

$$F_2(s) = \begin{bmatrix} e^{j\delta_1} p_1 \\ \vdots \\ e^{j\delta_{2U}} p_{2U} \end{bmatrix} \in \mathbb{C}^{U \cdot 2 \times 1}$$

where $p_u$ and $\delta_u$, $u=1, 2, \ldots, 2U$ are quantized amplitude and phase beam-combining coefficients, respectively.

For rank-R transmission, $F_2(s)$ contains R vectors, where the entries of each vector are chosen to combine single or multiple beams within each polarization and/or combining them across both polarizations.

The selection of the matrices $F_1$ and $F_2(s)$ is performed by the UE based on the knowledge of the current channel conditions. The selected matrices are contained in the CSI report in the form of a RI and a PMI and used at the gNB to update the multi-user precoder for the next transmission time interval.

An inherent drawback of the current CSI reporting formats described in [2] for the implicit feedback scheme is that the RI and PMI only contain information of the current channel conditions. Consequently, the CSI reporting rate is related to the channel coherence time which defines the time duration over which the channel is considered to be not varying. This means, in quasi-static channel scenarios, where the UE does not move or moves slowly, the channel coherence time is large and the CSI needs to be less frequently updated. However, if the channel conditions change fast, for example due to a high movement of the UE in a multi-path channel environment, the channel coherence time is short and the transmit signals experience severe fading caused by a Doppler-frequency spread. For such channel conditions, the CSI needs to be updated frequently which causes a high feedback overhead. Especially, for future NR systems (Rel. 16) that are likely to be more multi-user centric, the multiple CSI reports from users in highly-dynamic channel scenarios will drastically reduce the overall efficiency of the communication system.

To overcome this problem, several explicit CSI feedback schemes have been proposed that take into account the channel-evolution over time (see reference [3]). Here, explicit CSI refers to reporting of explicit channel coefficients from the UE to the gNB without a codebook for the precoder selection at the UE. Those schemes have in common estimating the parameters of the dominant channel taps of the multipath propagation channel as well as their time-evolution at the UE. For example, in [3] each channel tap is modelled as a sum of sub-channel taps where each sub-tap is parameterized with a Doppler-frequency shift and path gain. The estimated parameters for each channel tap are fed back to the base station, where they are used with a channel model for time-domain based channel prediction before downlink precoding. The availability of explicit CSI comes at an increased overhead for the feedback channel compared to implicit-based channel feedback, especially for slow-varying channels, which is not desired.

For example, WO 2018/052255 A1 relates to explicit CSI acquisition to represent the channel in wireless communication systems using the principle component analysis (PCA), which is applied on the frequency-domain channel matrix, covariance matrix, or eigenvector of the channel matrix. Thus, a codebook approach for downlink signal precoding at the base station equipped with a two-dimensional array and CSI reporting configuration is proposed. However, an inherent drawback of the proposed CSI reporting scheme is that the CSI report from a user contains only information about the selected CQI, PMI and RI with respect to the current MIMO channel state/realization and does not take into account channel variations over time caused by small-scale channel fading. Therefore, when users experience fast-fading channel conditions, a frequent CSI update is needed which causes a high feedback overhead over time. Moreover, the proposed CSI reporting scheme is restricted to one beam per layer PMI feedback which leads to a limited CSI accuracy and turns out to be insufficient for CSI acquisition in multi-user MIMO.

Moreover, to track channel-evolution over time, the reference signal need be spread over time. In the current 3GPP NR specification [1], a single shot CSI-RS is configured at a particular time slot. Such slots of CSI-RS are periodically transmitted, or triggered on demand. The configuration of a CSI-RS resource set(s) which may refer to NZP-CSI-RS, CSI-IM or CSI-SSB resource set(s) [2] is performed using the following higher layer parameters (see reference [4]):

CSI-ResourceConfig—The resource set(s) configuration consists of the IDs of the resources configured in the resource set(s), the type of each CSI-RS resource in terms of its periodicity, and the bandwidth part they are configured in.

CSI-ResourcePeriodicityAndOffset—Mentions the periodicity of a CSI-RS resource in terms of number of slots and offset of CSI-RS.

CSI-RS-ResourceMapping—Mentions the resource elements in the time-frequency map the CSI-RS resource is mapped to, number of CSI-RS ports, the CDM type used for the mapped reference symbols, and the density and bandwidth of occupancy of the reference symbols in the frequency domain.

frequencyDomainAllocation
nrofPorts
firstOFDMSymbolInTimeDomain
firstOFDMSymbolInTimeDomain2
cdm-Type
density
freqBand While the CSI-RS design may be used to acquire CSI for a link adaptation (modulation and coding scheme—MCS), and for selecting a precoding matrix from a specific channel realization/snapshot, it cannot track channel evolution in time to estimate Doppler-frequency components of a MIMO channel.

It is noted that the information in the above section is only for enhancing the understanding of the background of the invention and therefore it may contain information does is not part of conventional technology that is already known to a person of ordinary skill in the art.

SUMMARY

According to an embodiment, a communication device for providing a channel state information, CSI, feedback in a wireless communication system may have: a transceiver configured to receive, from a transmitter a radio signal via a time-variant, frequency-selective MIMO channel, the radio signal including downlink reference signals according to a reference signal configuration including a number of antenna ports, and downlink signals including the reference signal configuration; and a processor configured to
  estimate an explicit CSI in the frequency domain using measurements on the downlink reference signals on the radio channel, the downlink reference signals provided over a certain observation time,
  select, based on a performance metric, a Doppler-delay precoder matrix for a composite Doppler-delay-beam three-stage precoder, the Doppler-delay-beam three-stage precoder being based on one or more codebooks, the one or more codebooks including
    one or more transmit-side spatial beam components of the composite Doppler-delay-beam three-stage precoder,
    one or more delay components of the composite Doppler-delay-beam three-stage precoder, and
    one or more Doppler-frequency components of the composite Doppler-delay-beam three-stage precoder,
  calculate either one or more of a channel quality indicator, CQI, and/or a precoder matrix indicator, PMI, and/or a rank indicator, RI, using the explicit CSI and the composite Doppler-delay-beam three-stage precoder with the selected Doppler-delay-beam precoder matrix, and
  report to the transmitter the CSI feedback including either one or more of the CQI, and/or the PMI and/or the RI, wherein the PMI and RI are used to indicate the Doppler-delay-beam three-stage composite precoder matrix for the configured antenna ports.

Another embodiment may have a communication device for providing a channel state information, CSI, feedback in a wireless communication system, wherein the communication device is configured to receive a reference signal resource configuration, e.g., a CSI-RS resource configuration, including a parameter, like a higher layer (e.g., RRC) parameter, e.g., referred to as CSI-RS-BurstDuration, the parameter indicating a time-domain-repetition of the downlink reference signals, e.g., in terms of a number of consecutive slots the downlink reference signals are repeated in, and wherein the communication device is configured to determine the CSI feedback based on the repeated downlink reference signals and to report the determined CSI feedback.

According to another embodiment, a transmitter in a wireless communication system including a communication device may have: an antenna array including a plurality of antennas for a wireless communication with one or more communication devices of claim 1 or claim 39 for providing a channel state information, CSI, feedback to the transmitter; and a precoder connected to the antenna array, the precoder to apply a set of beamforming weights to one or more antennas of the antenna array to form, by the antenna array, one or more transmit beams or one or more receive beams, a transceiver configured to
  transmit, to the communication device, downlink reference signals (CSI-RS) according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; and
  receive uplink signals including a plurality of CSI reports from the communication device; and
a processor configured to:
  extract at least the two component precoder matrix identifier and the rank indicator from the plurality of CSI reports; and
  construct a Doppler-delay-beam precoder matrix applied on the antenna ports using a first component and a second component of the PMI, and determine the beamforming weights responsive to the constructed precoder matrix.

According to another embodiment, a wireless communication network may have:
  at least one communication device for providing a channel state information, CSI, feedback in a wireless communication system, which communication device may have:
    a transceiver configured to receive, from a transmitter a radio signal via a time-variant, frequency-selective MIMO channel, the radio signal including downlink reference signals according to a reference signal configuration including a number of antenna ports, and downlink signals including the reference signal configuration; and
    a processor configured to
    estimate an explicit CSI in the frequency domain using measurements on the downlink reference signals on the radio channel, the downlink reference signals provided over a certain observation time,
    select, based on a performance metric, a Doppler-delay precoder matrix for a composite Doppler-delay-beam three-stage precoder, the Doppler-delay-beam three-stage precoder being based on one or more codebooks, the one or more codebooks including
      one or more transmit-side spatial beam components of the composite Doppler-delay-beam three-stage precoder,
      one or more delay components of the composite Doppler-delay-beam three-stage precoder, and
      one or more Doppler-frequency components of the composite Doppler-delay-beam three-stage precoder,
    calculate either one or more of a channel quality indicator, CQI, and/or a precoder matrix indicator, PMI, and/or a rank indicator, RI, using the explicit CSI and the composite Doppler-delay-beam three-stage precoder with the selected Doppler-delay-beam precoder matrix, and
    report to the transmitter the CSI feedback including either one or more of the CQI, and/or the PMI and/or the RI, wherein the PMI and RI are used to indicate the Doppler-delay-beam three-stage composite precoder matrix for the configured antenna ports; and
  at least one transmitter in a wireless communication system including a communication device, which transmitter may have:
    an antenna array including a plurality of antennas for a wireless communication with one or more communication devices of claim 1 or claim 39 for providing a channel state information, CSI, feedback to the transmitter; and
    a precoder connected to the antenna array, the precoder to apply a set of beamforming weights to one or more antennas of the antenna array to form, by the antenna array, one or more transmit beams or one or more receive beams, a transceiver configured to transmit, to the communication device, downlink reference signals (CSI-RS) according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; and receive uplink signals including a plurality of CSI reports from the communication device; and a processor configured to:

extract at least the two component precoder matrix identifier and the rank indicator from the plurality of CSI reports; and construct a Doppler-delay-beam precoder matrix applied on the antenna ports using a first component and a second component of the PMI, and determine the beamforming weights responsive to the constructed precoder matrix.

According to yet another embodiment, a method for providing a channel state information, CSI, feedback in a wireless communication system may have the steps of: receiving, from a transmitter, a radio signal via a time-variant, frequency-selective MIMO channel, the radio signal including downlink reference signals according to a reference signal configuration including a number of antenna ports, and downlink signals including the reference signal configuration; estimating, at the communication device, an explicit CSI in the frequency domain using measurements on the downlink reference signals on the radio channel, the downlink reference signals provided over a certain observation time, based on a performance metric, selecting, at the communication device, a Doppler-delay precoder matrix for a composite Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix, and reporting from the communication device to the transmitter the CSI feedback including one or more of the CQI, the PMI and the RI, wherein the PMI and RI are used to indicate the Doppler-delay-beam three-stage composite precoder matrix for the configured antenna ports.

According to yet another embodiment, a method for transmitting in a wireless communication system including a communication device and a transmitter may have the steps of transmitting, to a communication device, downlink reference signals (CSI-RS) according to a CSI-RS configuration including a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals including the CSI-RS configuration; receiving, at the transmitter, uplink signals including a plurality of CSI reports from the communication device; extracting, at the transmitter, at least the two component precoder matrix identifier and the rank indicator from the plurality of CSI reports; constructing, at the transmitter, a Doppler-delay-beam precoder matrix applied on the antenna ports using a first component and a second component of the PMI, and determining, responsive to the constructed precoder matrix, beamforming weights for a precoder connected to an the antenna array of the transmitter.

According to still another embodiment, a non-transitory digital storage medium may have a computer program stored thereon to perform the inventive methods, when said computer program is run by a computer.

BRIEF DESCRIPTION OF THE DRAWINGS

Embodiments of the present invention will be detailed subsequently referring to the appended drawings, in which:

FIG. 5(a) illustrates a CSI-RS with a periodicity of 10 slots and no repetition (CSI-RS-BurstDuration not configured or CSI-RS-BurstDuration=0):

FIG. 5(b) illustrates a CSI-RS with a periodicity of 10 slots and repetition of 4 slots (CSI-RS-BurstDuration=4);

FIG. 6 illustrates a CSI-RS-BurstDuration information element in accordance with an embodiment;

DETAILED DESCRIPTION OF THE INVENTION

In the following, advantageous embodiments of the present invention are described in further detail with reference to the enclosed drawings in which elements having the same or similar function are referenced by the same reference signs.

Figure 1:
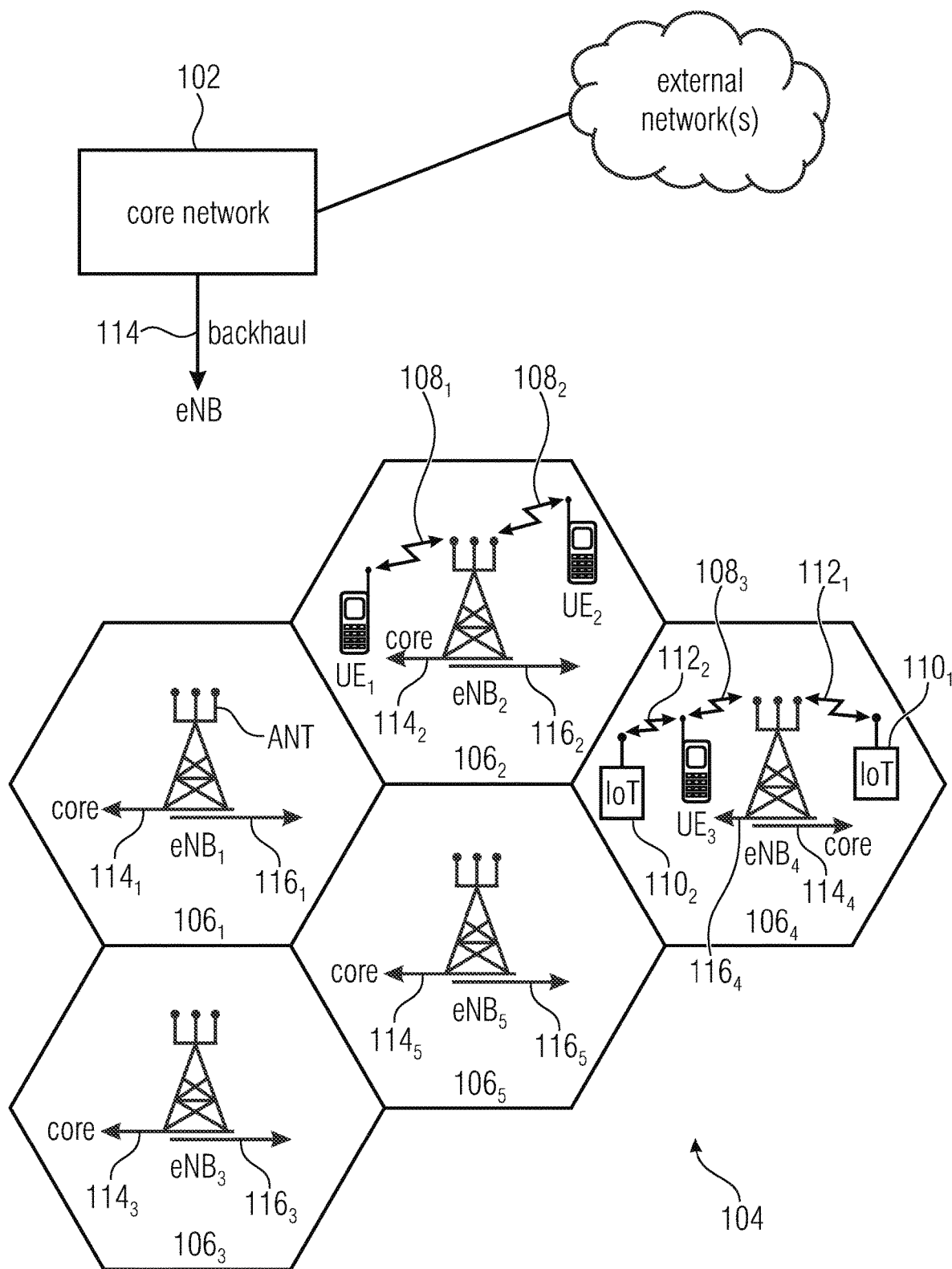
FIG. 1 shows a schematic representation of an example of a wireless communication system.
Figure 2:
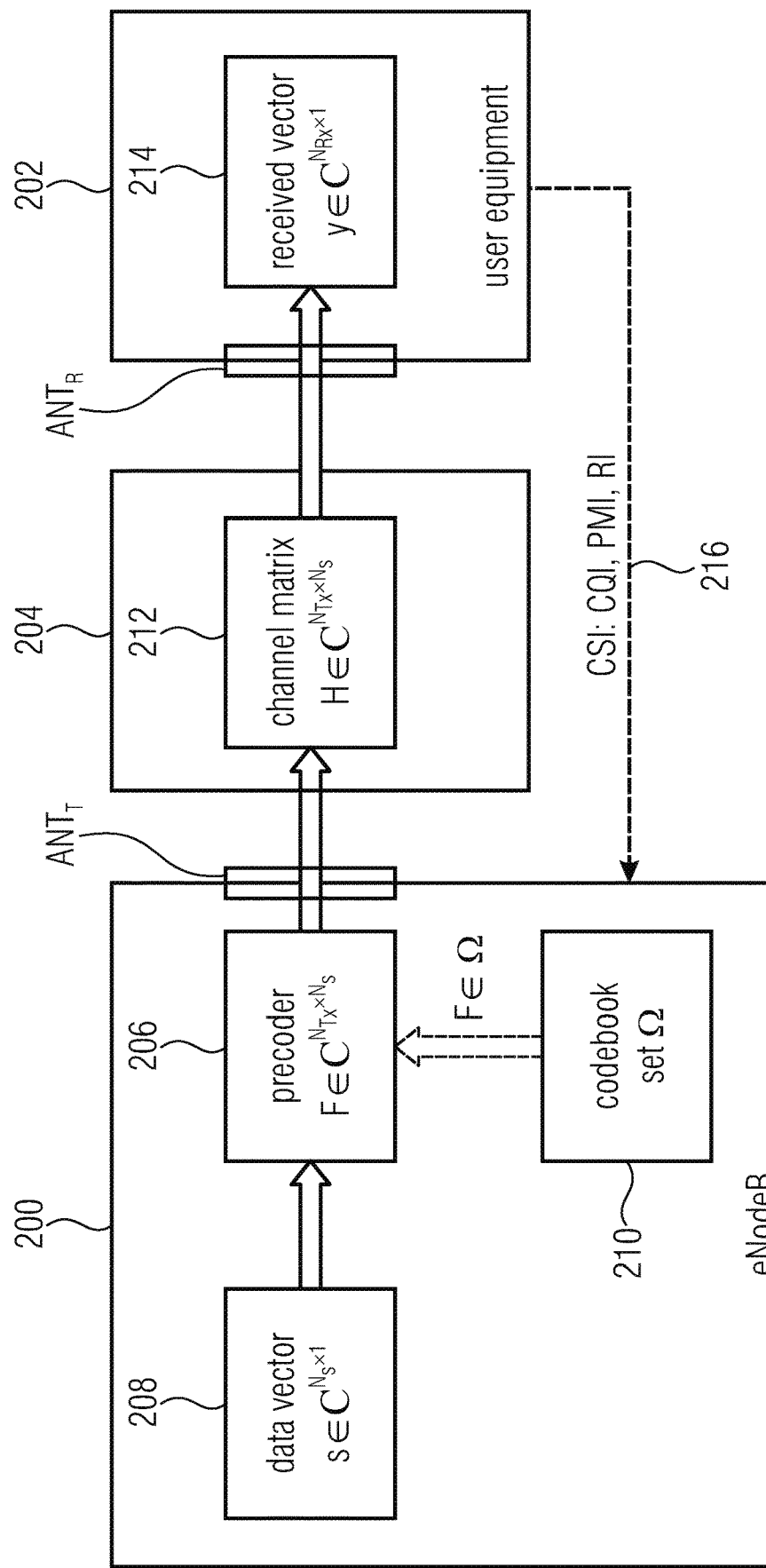
FIG. 2 shows a block-based model of a MIMO DL transmission using codebook-based-precoding in accordance with LTE release 8.
Figure 3:
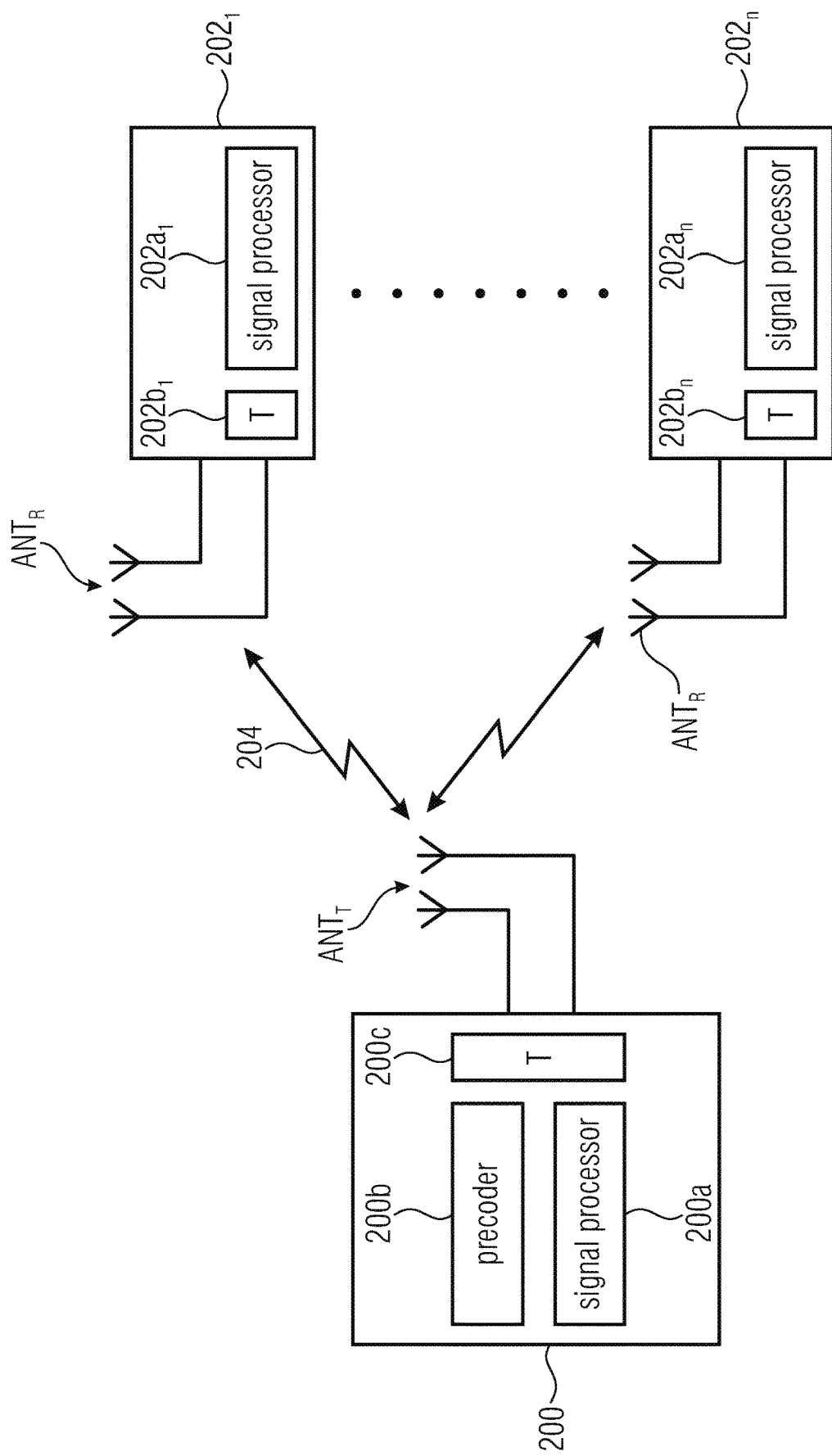
FIG. 3 is a schematic representation of a wireless communication system for communicating information between a transmitter, which may operate in accordance with the inventive teachings described herein, and a plurality of receivers, which may operate in accordance with the inventive teachings described herein.

Embodiments of the present invention may be implemented in a wireless communication system or network as depicted in FIG. 1 or FIG. 2 including transmitters or transceivers, like base stations, and communication devices (receivers) or users, like mobile or stationary terminals or IoT devices, as mentioned above. FIG. 3 is a schematic representation of a wireless communication system for communicating information between a transmitter 200, like a base station, and a plurality of communication devices 202₁ to 202ₙ, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200a. The UEs 202 include one or more antennas $ANT_R$ or an antenna array having a plurality of antennas, a signal processor 202a₁, 202aₙ, and a transceiver 202b₁, 202bₙ. The base station 200 and the respective UEs 202 may operate in accordance with the inventive teachings described herein.

User Equipment

The present invention provides a communication device 202 for providing a channel state information, CSI, feedback in a wireless communication system, the communication device 202 comprising:

- a transceiver 202b configured to receive, from a transmitter 200 a radio signal via a time-variant, frequency-selective MIMO channel 204, the radio signal including downlink reference signals according to a reference signal configuration comprising a number of antenna ports, and downlink signals comprising the reference signal configuration; and a processor (202a) configured to
  - estimate an explicit CSI in the frequency domain using measurements on the downlink reference signals on the radio channel 204, the downlink reference signals provided over a certain observation time,
  - select, based on a performance metric, a Doppler-delay precoder matrix (W) for a composite Doppler-delay-beam three-stage precoder, the Doppler-delay-beam three-stage precoder being based on one or more codebooks, the one or more codebooks including
    - one or more transmit-side spatial beam components of the composite Doppler-delay-beam three-stage precoder,
    - one or more delay components of the composite Doppler-delay-beam three-stage precoder, and
    - one or more Doppler-frequency components of the composite Doppler-delay-beam three-stage precoder,
  - calculate one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix (W), and
  - report to the transmitter 200 the CSI feedback including either one or more of the CQI, and/or the PMI and/or the RI, wherein the PMI and RI are used to indicate the Doppler-delay-beam three-stage composite precoder matrix for the configured antenna ports.

The present invention provides a communication device 202 for providing a channel state information, CSI, feedback in a wireless communication system. The communication device 202 receives a reference signal resource configuration, e.g., a CSI-RS resource configuration, including a parameter, like a higher layer (e.g., RRC) parameter, e.g., referred to as CSI-RS-BurstDuration, the parameter indicating a time-domain-repetition of the downlink reference signals, e.g., in terms of a number of consecutive slots the downlink reference signals are repeated in. The communication device determines the CSI feedback based on the repeated downlink reference signals and reports the determined CSI feedback, e.g., to a transmitter providing the reference signals.

In accordance with embodiments, the Doppler-delay-beam three-stage precoder is based on three separate codebooks, and wherein the three separate codebooks include

- a first codebook ($\Omega_1$) for the one or more transmit-side spatial beam components of the composite Doppler-delay-beam three-stage precoder,
- a second codebook ($\Omega_2$) for the one or more delay components of the composite Doppler-delay-beam three-stage precoder, and
- a third codebook ($\Omega_3$) for the one or more Doppler-frequency components of the composite Doppler-delay-beam three-stage precoder.

In accordance with embodiments, the Doppler-delay precoder matrix (W) is represented by $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix},$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, $f_{p,u,d,v}^{(l)}$ is the v-th Doppler-frequency vector of size T×1 associated with the l-th layer, d-th delay, u-th spatial beam, and the p-th (p=1,2) polarization of the precoder;

$d_{p,u,d}^{(l)}$ is the d-th delay vector of size S×1 associated with the L-th layer, u-th spatial beam and the p-th polarization of the precoder;

$b_u^{(l)}$ is the u-th spatial beam associated with the l-th layer $\gamma_{p,u,d,v}^{(l)}$ is the Doppler-delay coefficient associated with the l-th layer, u-th spatial beam, d-th delay, v-th Doppler-frequency and the p-th polarization of the precoder, and $P^{(l)}$ is a scalar normalization factor to ensure that the average total transmission power over all precoder layers is 1.

In accordance with embodiments, the Doppler-delay-beam precoder is represented by a dual-stage precoder:

$$W^{(l)} = W^{(1,l)}w^{(2,l)} \in N_t \cdot T \cdot S \times 1,$$

where $$W^{(1,l)} = \begin{bmatrix} X_1 & 0 \\ 0 & X_2 \end{bmatrix} \text{ with}$$

$$X_1 = \left[ f^{(l)}_{1,0,0,0} \otimes d^{(l)}_{1,0,0} \otimes b^{(l)}_0 \; \ldots \; f^{(l)}_{1,u,d,v} \otimes d^{(l)}_{1,u,d} \otimes b^{(l)}_u \; \ldots \; f^{(l)}_{1,U^{(l)}-1,D^{(l)}_u-1,F^{(l)}_{d,u}-1} \otimes d^{(l)}_{1,U^{(l)}-1,D^{(l)}_u-1} \otimes b^{(l)}_{U^{(l)}-1} \right],$$

$$X_2 = \left[ f^{(l)}_{2,0,0,0} \otimes d^{(l)}_{2,0,0} \otimes b^{(l)}_0 \; \ldots \; f^{(l)}_{2,u,d,v} \otimes d^{(l)}_{2,u,d} \otimes b^{(l)}_u \; \ldots \; f^{(l)}_{2,U^{(l)}-1,D^{(l)}_u-1,F^{(l)}_{d,u}-1} \otimes d^{(l)}_{2,U^{(l)}-1,D^{(l)}_u-1} \otimes b^{(l)}_{U^{(l)}-1} \right],$$

and $w^{(2,l)}$ contains the complex Doppler-delay-beam combining coefficients, $$w^{(2,l)} = [\gamma^{(l)}_{1,0,0,0} \; \ldots \; \gamma^{(l)}_{1,u,d,v} \; \ldots \; \gamma^{(l)}_{1,U^{(l)}-1,D^{(l)}_u-1,F^{(l)}_{d,u}-1} \gamma^{(l)}_{2,0,0,0} \ldots \gamma^{(l)}_{2,u,d,v} \ldots \gamma^{(l)}_{2,U^{(l)}-1,D^{(l)}_u-1,F^{(l)}_{d,u}-1}]^T,$$

where
- $f^{(l)}_{p,u,d,v}$ is the v-th Doppler-frequency vector of size T×1 associated with the l-th layer, d-th delay, u-th spatial beam, and the p-th (p=1,2) polarization of the precoder;
- $d^{(l)}_{p,u,d}$ is the d-th delay vector of size S×1 associated with the l-th layer, u-th spatial beam and the p-th polarization of the precoder;
- $b^{(l)}_u$ is the u-th spatial beam associated with the l-th layer
- $\gamma^{(l)}_{p,u,d,v}$ is the Doppler-delay coefficient associated with the l-th layer, u-th spatial beam, d-th delay, v-th Doppler-frequency and the p-th polarization of the precoder, and
- $P^{(l)}$ is a scalar normalization factor to ensure that the average total transmission power over all precoder layers is 1.

In accordance with embodiments,
the first codebook ($\Omega_1$) comprises a first oversampled DFT-codebook matrix of size $N_1N_2 \times O_{1,1}N_1O_{1,2}N_2$ from which the vectors $b^{(l)}_u$ are selected, where $N_1$ and $N_2$ refer to the first and second numbers of antenna ports, respectively, and $O_{1,1}$ and $O_{1,2}$ refer to the oversampling factors with $O_{1,1} \in \{1, 2, 3, \ldots\}$ and $O_{1,2} \in \{1, 2, 3, \ldots\}$, wherein the second codebook ($\Omega_2$) comprises a second oversampled DFT-codebook matrix of size $S \times SO_2$ from which the delay vectors $d^{(l)}_{u,d}$ are selected, where S refers to the number of configured sub-bands/PRBs, or subcarriers, and $O_2$ refers to the oversampling factor $O_2 = 1, 2, \ldots$, and wherein the third codebook ($\Omega_2$) comprises a third oversampled DFT-codebook matrix of size $T \times TO_3$ from which the Doppler-frequency vectors $f^{(l)}_{p,u,d,v}$ are selected, where T refers to the number of time instances during the observation time, and $O_3$ refers to the oversampling factor with $O_3 = 1, 2, \ldots$.

In accordance with embodiments, the communication device is configured to report to the transmitter the CSI feedback according to a CSI reporting configuration received from the transmitter, the CSI reporting configuration including, for example, the parameter ReportQuantity, which includes at least one the following values:
- cri-RI-PMIDD-CQI,
- cri-RI-PMIDy-CQI,
- cri-RI-PMIDr-CQI,
- cri-RI-LI-PMIDD-CQI,
- cri-RI-LI-PMIDy-CQI,
- cri-RI-LI-PMIDr-CQI,
- cri-RI-PMIDD,
- cri-RI-PMIDy,
- cri-RI-PMIDr, wherein the PMI quantities are defined as:
- PMIDD—PMI values including the delay and the Doppler-frequency component configurations,
- PMIDy—PMI values including only the delay component configuration, excluding the Doppler-frequency component(s), and
- PMIDr—PMI values including only the Doppler-frequency component configuration, excluding the delay component(s).

In accordance with embodiments, the communication device is configured to receive the following values from the transmitter using Radio Resource Control (RRC) layer or physical layer (L1) parameters:
- values of S and T for the configuration of the delay and Doppler-frequency component codebooks ($\Omega_2$, $\Omega_3$), and
- parameters $N_1$, $N_2$ and oversampling factors $O_{1,1}$ and $O_{1,2}$ for the configuration of the first codebook ($\Omega_1$).

In accordance with embodiments, the spatial beam components are configured as follows:
- the number of beams $U^{(l)}$ is non-identical over the layers, or
- the number of beams $U^{(l)}$ is identical for all layers such that $U^{(l)} = U$, $\forall l$.

In accordance with embodiments, the delay components are configured as follows:
- the $D^{(l)}_u$ delay values, e.g., the indices of delay DFT vectors, may vary for each beam, layer and polarization indices.
- the $D^{(l)}_u$ delay values, e.g., the indices of delay DFT vectors, vary for each beam and layer indices and may remain identical over the polarization indices.
- the $D^{(l)}_u$ delay values, e.g., the indices of delay DFT vectors, are identical for all beam, layer and polarizations indices.
- the $D^{(l)}_u$ delay values, e.g., the indices of delay DFT vectors, are identical for all beam and layer indices and may over polarization indices.
- the $D^{(l)}_u$ delay values, e.g., the indices of delay DFT vectors, are identical for all beam and polarization indices, and vary over the layer indices.
- the $D^{(l)}_u$ delay values, e.g., the indices of delay DFT vectors, are identical for all beam indices, and vary over the layer and polarization indices.
- the number of delays $D^{(l)}_u$ depends on the beam and layer index, or
- the number of delays $D^{(l)}_u$ depends on the beam index, and remains identical for all layer indices, $D^{(l)}_u = D_u$, $\forall l$, u, or the number of delays $D_u^{(l)}$ is identical for all beam indices, but varies per layer, $D_u^{(l)}=D^{(l)}$, ∀l, u, or the number delays $D_u^{(l)}$ is identical for all beam indices and layer indices, $D_u^{(l)}=D$ ∀l, u.

In accordance with embodiments, the Doppler-frequency components are configured as follows:

the $F_{d,u}^{(l)}$ Doppler-frequency values, e.g., the indices of Doppler-frequency DFT-vectors, vary over beam, delay, layer and polarization indices.

the $F_{d,u}^{(l)}$ Doppler-frequency values, e.g., the indices of Doppler-frequency DFT-vectors, vary over beam, delay, layer indices but remain identical over polarization indices.

the $F_{d,u}^{(l)}$ Doppler-frequency values, e.g., the indices of Doppler-frequency DFT-vectors, are identical for all beam and delay indices, and may vary over layer and polarization indices.

the $F_{d,u}^{(l)}$ Doppler-frequency values, e.g., the indices of Doppler-frequency DFT-vectors, are identical for all beam, delay and polarization indices, and may vary over layer indices.

the number of Doppler-frequency components $F_{d,u}^{(l)}$ depends on the beam index, delay index and layer index, or the number of Doppler-frequency components $F_{d,u}^{(l)}$ is identical for all beam, delays and layer indices, such that $F_{d,u}^{(l)}=F$, ∀u, d, l, or the number of Doppler frequency-components $F_{d,u}^{(l)}$ is identical for all beam indices and all delay indices, but varies over the layer indices $F_{d,u}^{(l)}=F^{(l)}$, ∀u, d, l, or the number of Doppler frequency-vectors $F_{d,u}^{(l)}$ is identical for all beam indices, but varies over delay and layer indices, $F_{d,u}^{(l)}=F_d^{(l)}$, ∀u, d, l, or the number of Doppler frequency-components $F_{d,u}^{(l)}$ is identical for all beam indices and layer indices, but varies over delay indices, $F_{d,u}^{(l)}=F_d$, ∀u, d, l, or the number of Doppler-frequency-components $F_{d,u}^{(l)}$ is different for the U beams, and identical for all delay and layer indices, $F_{d,u}^{(l)}=F_u$, ∀u, d, l, or the number of Doppler-frequency-components $F_{d,u}^{(l)}$ varies over beam and delay indices and is identical for all layer indices, $F_{d,u}^{(l)}=F_{d,u}$, ∀u, d, l, or the number of Doppler frequency-components $F_{d,u}^{(l)}$ vanes over beam and layer indices, and is identical for all delay indices, $F_{d,u}^{(l)}=F_u^{(l)}$, ∀u, d, l, or In accordance with embodiments, the explicit CSI is represented by a three-dimensional channel tensor $\mathcal{H} \in \mathbb{C}^{N \times S \times T}$ of the dimension N×S×T with S being the number of configured sub-bands/PRBs, or subcarriers, T being the number of time instances during the observation time, and $N=N_r \cdot N_1 \cdot N_2 \cdot P$, and the first, second and third dimensions of the channel tensor representing the space, frequency, and time components of the time-variant frequency-selective MIMO channel, respectively, or the explicit CSI is represented by a four-dimensional channel tensor $\mathcal{H} \in \mathbb{C}^{N_r \times N_t \times S \times T}$ of dimension $N_r \times N_t \times S \times T$, where $N_t=N_1 \cdot N_2 \cdot P$, the first and second dimensions of $\mathcal{H}$ representing the receive-side and transmit-side space components of the time-variant frequency-selective MIMO channel, respectively, and the third and fourth dimensions of $\mathcal{H}$ representing the frequency and time component of the channel, respectively.

In accordance with embodiments, the processor is configured to select a Doppler-delay precoder matrix (W) based on a performance metric for e.g., the mutual-information I(W; $\mathcal{H}$), which is a function of the Doppler-delay precoder matrix W and a multi-dimensional channel tensor $\mathcal{H}$.

In accordance with embodiments, the processor is configured to select a wideband CQI that optimizes the average block error rate block_error_rate($\mathcal{H}$ |W$^{(l)}$ (l=1, . . . , L)) at the communication device for the selected composite Doppler-delay-beam precoder matrix W$^{(l)}$ (l=1, . . . , L) and a multi-dimensional channel tensor $\mathcal{H}$ for the T time instants.

In accordance with embodiments, the processor is configured to use, in a first step, a high resolution parameter estimation algorithm to estimate parameters of a channel model directly from a multi-dimensional channel tensor $\mathcal{H}$, or to calculate the coefficients of H(t, w) directly in a non-parameterized form from the MIMO channel tensor $\mathcal{H}$, use, in a second step, the parameterized channel model and the selected Doppler-delay-beam composite precoder W$^{(l)}$ (l=1, . . . , L) to calculate a parameterized precoded time-variant MIMO channel model frequency-domain response as $$H_{prec}(t,w)=H(t,w)[W^{(1)}(t,w),W^{(2)}(t,w), \ldots ,W^{(L)}(t,w)],$$

where the (i, j) entry of $[H(t,w)]_{i,j}=h_{i,j}(t,w)$, and W$^{(l)}$(t,w) is the t-th block and w-th column of W$^{(l)}$, use, in a third step, the parameterized precoded MIMO channel model response to calculate one or more CQI values for one or more future time instants.

In accordance with embodiments, the processor is configured to predict a CQI value for a time-instant/slot n+K, where n denotes the current time-instant/slot, and K denotes the relative time difference with respect to the current time-instant/slot n, and use the K predicted CQI values to calculate differential predicted CQI values by reducing the K predicted CQI values by the average CQI value.

In accordance with embodiments, the communication device is configured to receive a CSI reporting configuration comprising a parameter CQI-PredictionTime assigned with the value K which is used by the communication device for CQI prediction.

In accordance with embodiments, in case the CSI feedback uses the PMI, the processor is configured to report at least a two-component PMI, where the first PMI corresponds to the selected vectors $b_u^{(l)}$, $d_{p,u,d}^{(l)}$ and $f_{p,u,d,v}^{(l)}$, and where the second PMI corresponds to 2 $\Sigma_{u,d,l}F_{d,u}^{(l)}$ Doppler-delay-beam combining coefficients $\gamma_{p,u,d,v}^{(l)}$ from the communication device to the transmitter.

In accordance with embodiments, the processor is configured to represent the first-component PMI in the form of three-tuple sets, where each three-tuple (u,d,v) is associated with a selected spatial beam vector $b_u^{(l)}$, a selected delay vector $d_{p,u,d}^{(l)}$, and a selected Doppler-frequency vector $f_{p,u,d,v}^{(l)}$, the three-tuple sets being represented by $i_1=[i_{1,1}, i_{1,2}, i_{1,3}]$, where $i_1$ represents the first PMI component, and where $i_{1,1}$ contains $\Sigma_l U^{(l)}$ indices of the selected DFT-vectors for the spatial beams, $i_{1,2}$ contains $2\Sigma_{u,l} D_u^{(l)}$ indices of the selected delay-vectors, and $i_{1,3}$ contains $2\Sigma_{u,d,l}F_{d,u}^{(l)}$ i indices of the selected Doppler-frequency-vectors, quantize the Doppler-delay-beam combining coefficients using a codebook approach, where the quantized Doppler-delay-beam combining coefficients are represented by $i_2$, the second PMI component, and report the two PMI components to the transmitter.

In accordance with embodiments, for quantizing the complex Doppler-delay coefficients $\gamma_{p,u,d,v}^{(l)}$ with a codebook approach, each coefficient is represented by $$\gamma_{p,u,d,v}^{(l)} = \hat{\gamma}_{p,u,d,v}^{(l)} \phi_{p,u,d,v}^{(l)},$$

where $\hat{\gamma}_{p,u,d,v}^{(l)}$ is a polarization-, beam-, delay- and Doppler-frequency-dependent amplitude coefficient which is quantized with N bits; and $\phi_{p,u,d,v}^{(l)}$ represents a phase which is represented by a BPSK, or QPSK, or 8PSK, or any other higher-order PSK constellation, or wherein each coefficient is represented by its real and imaginary part as $$\gamma_{p,u,d,v}^{(l)} = \text{Re}\{\hat{\gamma}_{p,u,d,v}^{(l)}\} + j \cdot \text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{p,u,d,v}^{(l)}\}$ are quantized each with N bits.

In accordance with embodiments, the CSI feedback further includes a rank indicator, RI, and wherein the processor is configured to report the RI for the transmission, wherein the RI is selected with respect to the Doppler-delay-beam precoder matrix $W^{(l)}$ (l=1, ..., L) and denotes an average number of layers supported by the Doppler-delay-beam precoded time-variant frequency-selective MIMO channel.

In accordance with embodiments, the communication device is configured with a CSI-RS reporting configuration via a higher layer for reporting either the CQI and/or RI and/or PMI for a beam-formed CSI-RS, the vectors in the first codebook matrix represented by $N_1N_2$-length column vectors, where the m-th vector (m=1, ..., $N_1N_2$) contains a single 1 at the m-th position and zeros elsewhere.

In accordance with embodiments, the communication device is configured to receive a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in.

In accordance with embodiments, the communication device assumes that for CQI, and/or RI, and/or PMI calculation, the transmitter applies the Doppler-delay-beam precoder to PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = W(t,i) \begin{bmatrix} x^{(t,0)}(i) \\ \vdots \\ x^{(t,v-1)}(i) \end{bmatrix},$$

where $[x^{(t,0)}(i), \ldots, x^{(t,v-1)}(i)]^T$ is a symbol vector of PDSCH symbols, $P \in \{1,2, 4, 8, 12, 16, 24, 32\}$, $x^{(t,u)}(i)$ is the i-th symbol of layer u at time instant t, $y^{(t,u)}(i)$ is the precoded symbol transmitted on antenna port u at time instant t, and $W(t,i)=[W^{(1)}(t,i), \ldots, W^{(L)}(t,i)]$ is the predicted precoder matrix, with $W^{(l)}(t,i)$ being the t-th block and i-th column of $W^{(l)}$.

Base Station

The present invention provides a transmitter 200 in a wireless communication system including a communication device 202, the transmitter comprising:

an antenna array $ANT_T$ having a plurality of antennas for a wireless communication with one or more of the inventive communication devices $202_1$, $202_2$ for providing a channel state information, CSI, feedback to the transmitter 200;

a precoder 200b connected to the antenna array $ANT_T$, the precoder 200c to apply a set of beamforming weights to one or more antennas of the antenna array $ANT_T$ to form, by the antenna array $ANT_T$, one or more transmit beams or one or more receive beams; a transceiver 200c configured to transmit, to the communication device $202_1$, $202_2$, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and receive uplink signals comprising a plurality of CSI reports from the communication device $202_1$, $202_2$; and a processor 200a configured to extract at least the two component precoder matrix identifier and the rank indicator from the plurality of CSI reports; and construct a Doppler-delay-beam precoder matrix applied on the antenna ports using a first component and a second component of the PMI, and determine the beamforming weights responsive to the constructed precoder matrix.

In accordance with embodiments, to facilitate precoder matrix prediction for QT future time instants, the processor is configured to cyclically extend the Doppler-frequency DFT-vectors $f_{p,u,d,v}^{(l)}$ to a length-QT vectors $t_{p,u,d,v}^{(l)}$, the cyclic extension defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3,$ and the predicted precoder matrix for the l-th layer and q-th (q=1, ..., QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} t_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} t_{2,u,d,v}^{(l)}(q) \otimes d_{2,u,d}^{(l)T} \otimes b_u^{(l)} \end{bmatrix}$$

where $t_{p,u,d,v}^{(l)}(q)$ is the q-th entry of $t_{p,u,d,v}^{(l)}$.

System

The present invention provides a base wireless communication network, comprising at least one of the inventive UEs, and at least one of the inventive base stations.

In accordance with embodiments, the communication device and the transmitter comprises one or more of: a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Methods

The present invention provides a method for providing a channel state information, CSI, feedback in a wireless communication system, the method comprising:

receiving, from a transmitter, a radio signal via a time-variant, frequency-selective MIMO channel, the radio signal including downlink reference signals according to a reference signal configuration comprising a number of antenna ports, and downlink signals comprising the reference signal configuration;

estimating, at the communication device, an explicit CSI in the frequency domain using measurements on the downlink reference signals on the radio channel, the downlink reference signals provided over a certain observation time, based on a performance metric, selecting, at the communication device, a Doppler-delay precoder matrix (W) for a composite Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix (W), and reporting from the communication device to the transmitter the CSI feedback including one or more of the CQI, the PMI and the RI, wherein the PMI and RI are used to indicate the Doppler-delay-beam three-stage composite precoder matrix for the configured antenna ports.

The present invention provides a method for transmitting in a wireless communication system including a communication device and a transmitter, the method comprising:

transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;

receiving, at the transmitter, uplink signals comprising a plurality of CSI reports from the communication device;

extracting, at the transmitter, at least the two component precoder matrix identifier and the rank indicator from the plurality of CSI reports;

constructing, at the transmitter, a Doppler-delay-beam precoder matrix applied on the antenna ports using a first component and a second component of the PMI, and determining, responsive to the constructed precoder matrix, beamforming weights for a precoder connected to an the antenna array of the transmitter.

Computer Program Product

The present invention provides a computer program product comprising instructions which, when the program is executed by a computer, causes the computer to carry out one or more methods in accordance with the present invention.

Thus, embodiments of the present invention provides for an extension of the existing CSI-RS to track the channel time-evolution, e.g., for a channel having channel conditions which change fast, for example due to a high movement of the UE in a multi-path channel environment, and having a short channel coherence time. The present invention is advantageous as by tracking the channel time-evolution, even for channels with varying channel conditions, the CSI needs not to be updated less frequently, e.g., with a rate similar for channels with a long channel coherence time, thereby reducing or avoiding a feedback overhead. For example, the large-scale channel parameters such as path loss and shadow fading may not change quickly over time, even in a channel having a short channel coherence time, so that the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams, the precoder Doppler-frequency DFT-vectors, the delay DFT-vectors as well as the Doppler-delay coefficients of the Doppler-delay-beam three-stage precoder remain identical or substantially identical for a long time period, and need to be less frequently updated.

To address the above-mentioned issues in conventional approaches, according to which current CSI feedback schemes are not sufficient, embodiments of the present invention provide a CSI-RS design allowing track time-evolution of CSI or a new implicit CSI reporting scheme that takes into account the channel time-evolution and provides information about current and future RI, PMI and CQI in a compressed form to reduce the feedback rate.

Figure 4:
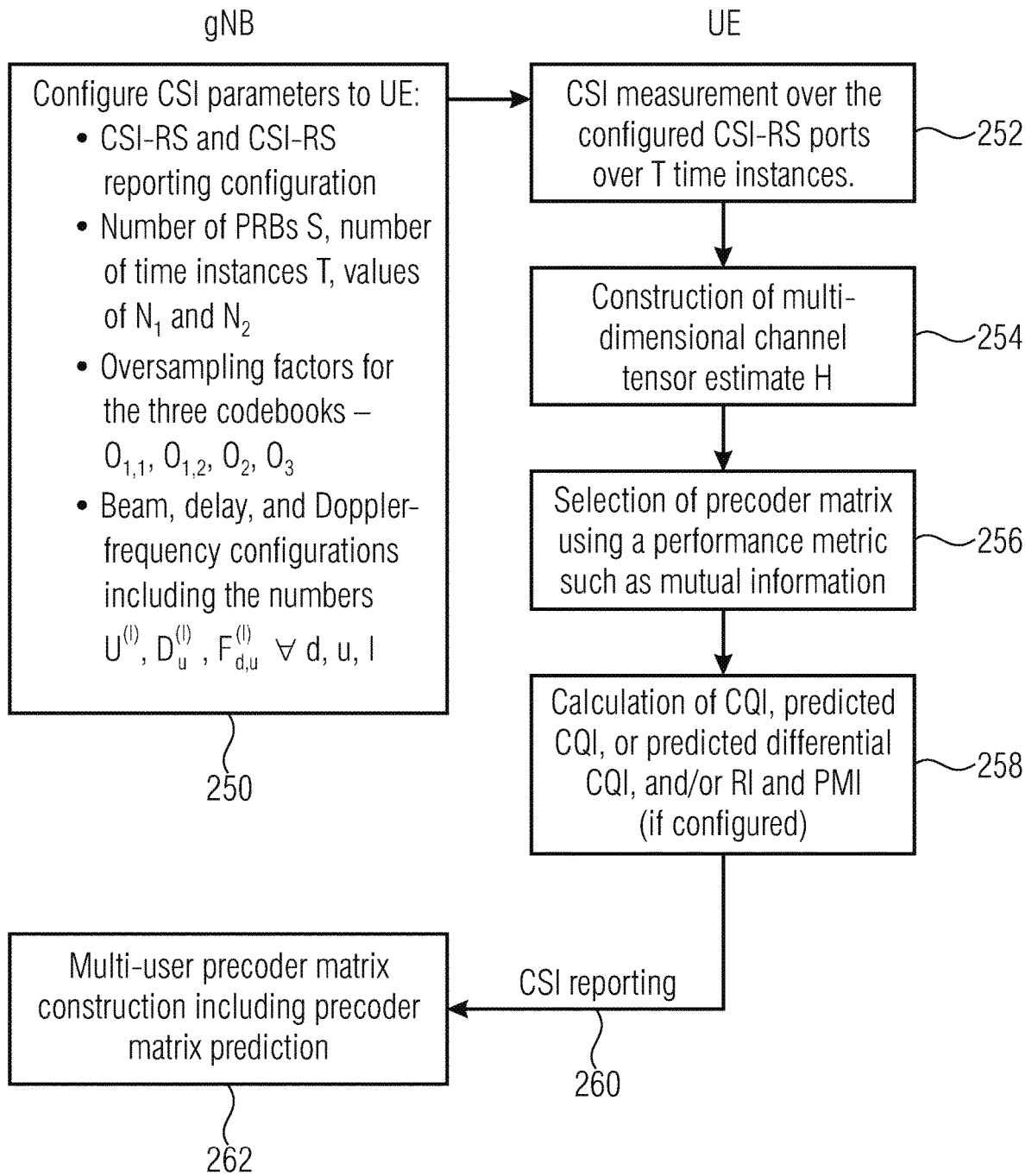
FIG. 4 is a flow diagram illustrating the configuration of CSI parameters, the CSI measurement, the composite precoder matrix calculation and the CSI reporting in accordance with an embodiment of the present invention

FIG. 4 is a flow diagram illustrating the configuration of CSI parameters, the CSI measurement, the composite precoder matrix calculation and the CSI reporting in accordance with an embodiment of the present invention. The UE may be configured with a CSI-RS resource configuration via a higher layer (such as RRC) containing information about the number of assigned CSI-RS ports used for the transmission to the UE. The number of CSI-RS ports, M, is equal to $PN_1N_2$ (where P=1 for co-polarized array antennas, and P=2 for dual-polarized array antennas at the base station), and where $N_1$ and $N_2$ are the number of antenna ports of the first and second spatial dimensions of the gNB array, respectively. The UE is configured with a CSI reporting configuration via a higher layer and/or a physical layer (via DCI) that also contains information for an evaluation of the CSI feedback parameters, such as CQI, RI and PMI, at the UE. The base station or gNB signals via a higher layer or a physical layer at least five integer values for $(N_1,N_2,P)$, S, and T, where $(N_1,N_2,P)$ are used to configure a first codebook, and S and T are used to configure a second codebook and a third codebook, respectively, for the PMI decomposition/calculation at the UE. The CQI, RI and PMI selection is performed at the UE according to the subsequently described embodiments.

At a step 250, the gNB or base station sends a CSI-RS configuration and CSI report configuration to the UE. In accordance with embodiments, the CSI-RS configuration may include a CSI-RS resource(s) configuration with respect to sub-clause 7.4.1.5 in TS 38.211 [1] and with sub-clause 6.3.2 in TS.38.331 [4]. Further, an additional higher layer parameter configuration referred to as CSI-RS-BurstDuration is included.

The CSI-RS-BurstDuration is included to provide a CSI-RS design allowing to track the time-evolution of the channel. In accordance with embodiments, a UE is configured with a CSI-RS resource set(s) configuration with the higher layer parameter CSI-RS-BurstDuration, in addition to the configurations from clause 7.4.1.5 in TS 38.211 [2] and clause 6.3.2 in TS.38.331 [4] mentioned above, to track the time-evolution of CSI. The time-domain-repetition of the CSI-RS, in terms of the number of consecutive slots the CSI-RS is repeated in, is provided by the higher layer parameter CSI-RS-BurstDuration. The possible values of CSI-RS-BurstDuration for the NR numerology $\mu$ are $2^\mu \cdot X_B$ slots, where $X_B \in \{0, 1, 2, \ldots, \text{maxNumBurstSlots}-1\}$. The NR numerology $\mu=0, 1, 2, 3, 4 \ldots$ defines, e.g., a subcarrier spacing of $2^\mu \cdot 15$ kHz in accordance with the NR standard.

For example, when the value of $X_B=0$ or the parameter CSI-RS-BurstDuration is not configured, there is no repetition of the CSI-RS over multiple slots. The burst duration scales with the numerology to keep up with the decrease in the slot sizes. Using the same logic used for periodicity of CSI-RS. FIG. 5(*a*) illustrates a CSI-RS with a periodicity of 10 slots and no repetition (CSI-RS-BurstDuration not configured or CSI-RS-BurstDuration=0), and FIG. 5(*b*) illustrates a CSI-RS with a periodicity of 10 slots and repetition of 4 slots (CSI-RS-BurstDuration=4). FIG. 6 illustrates a CSI-RS-BurstDuration information element in accordance with an embodiment. The information element of the new RRC parameter CSI-RS-BurstDuration is as follows: the value next to the text burstSlots indicates the value of $X_B$, which for a given New Radio numerology $\mu$ (see [1]) provides the burst duration $2^\mu \cdot X_B$ of the CSI-RS, i.e., the number of consecutive slots of CSI-RS repetition.

The burst-CSI-RS across multiple consecutive slots enables the extraction of time-evolution information of the CSI and for reporting of the precoder matrix, e.g. as a part of the PMI, in a way as described in more detail below. In other words, the UE may calculate the CQI, RI and PMI according to the embodiments described below with a repetition of the CSI-RS resource(s) over multiple consecutive slots, and report them accordingly.

Returning to the flow diagram of FIG. 4, the CSI report configuration provided by the eNB may further include one or more of at least the following parameters:
 a configuration of the CSI report configuration with respect to sub-clause 5.2.1.1 in TS 38.214 [2], and the following higher layer parameters: ReportQuantity listed in TS 38.331 [1] with the following additional parameters:
  cri-RI-PMIDD-CQI
  cri-RI-PMIDy-CQI
  cri-RI-PMIDr-CQI
  cri-RI-LI-PMIDD-CQI
  cri-RI-LI-PMIDy-CQI
  cri-RI-LI-PMIDr-CQI
  cri-RI-PMIDD
  cri-RI-PMIDy
  cri-RI-PMIDr The CRI (CSI-RS resource indicator), RI (rank indicator) and LI (layer indicator) mentioned in the reporting quantities are reported, i.e., the possible values reported and the format for reporting CRI, RI and LI are identical as the ones in TS 38.214 [2]. The PMI quantities mentioned in ReportQuantity are defined as:
 PMIDD—PMI values including the delay and the Doppler-frequency component configurations as described in the embodiments below;
 PMIDy—PMI values including only the delay component configuration as described in the embodiments below, excluding the Doppler-frequency component(s);
 PMIDr—PMI values including only the Doppler-frequency component configuration as described in the embodiments below, excluding the delay component(s).
a parameter CQI-PredictionTime assigned with the value K for CQI prediction (if configured).

The CQI value, predicted CQI value, etc. (if configured) as mentioned in the reporting quantity may be calculated as explained in subsequently described embodiments over multiple time slots. The values of the CQI reported are identical as mentioned in TS 38.214 [2].

In addition, the following parameters may be signaled by the eNB to the user equipment via physical layer or higher layer (RRC) parameters:
 values of S and T for the configuration of the delay and Doppler-frequency component codebooks $\Omega_2$ and $\Omega_3$, respectively, are represented by the parameters CodebookConfg-S, CodebookConfig-T. The oversampling factors $O_2$ and $O_3$ of the codebooks $\Omega_2$ and $\Omega_3$ are represented by CodebookConfig-O2 and CodebookConfig-O3, respectively.
 parameters $N_1$, $N_2$ and oversampling factors $O_{1,1}$ and $O_{1,2}$ for the configuration of the first codebook $\Omega_1$, as described below. The parameters $N_1$ and $N_2$ are represented by CodebookConfig-N1 and CodebookConfig-N2, respectively. The oversampling factors $O_{1,1}$ and $O_{1,2}$ are represented by CodebookConfig-O1_1 and CodebookConfig-O1_2, respectively.
In response to the report configuration, the UE
 performs, at step 252, measurements on downlink CSI-RS over T consecutive time-instants/slots,
 constructs, at step 254, the time-variant frequency-selective MIMO channel tensor $\mathcal{H}$;
 selects, at step 256, the Doppler-delay-beam composite three-stage precoder matrix for each layer (PMI selection) with respect to a specific performance metric as explained in more detail below;
 calculates, at step 258, a CQI value, a predicted CQI value, or predicted differential CQI values (if configured) for a future time instant or for a set of future time instants using the selected Doppler-delay-beam composite three-stage precoder matrix and at least one of the MIMO channel tensor $\mathcal{H}$ and a prediction of the MIMO channel tensor for future time instants, and, optionally, selects a RI value (if configured) using the selected Doppler-delay-beam composite three-stage precoder matrix and the MIMO channel tensor $\mathcal{H}$, and
 sends, at step 260, the CSI report to the gNB.

The gNB, at step 262, reconstructs the Doppler-delay-beam composite three-stage precoder matrix (PMI report) to facilitate multi-user precoding matrix calculation and precoder matrix prediction for future time instants.

Other embodiments of the inventive approach operating on the basis of repeated downlink reference signals may use other precoders or other techniques to determine the CSI feedback based on the repeated downlink reference signals and to report determine the CSI feedback.

CQI/PMI Reporting Using a Composite Doppler-Delay Three-Stage Precoder

In accordance with embodiments, once the UE is configured with a CSI-RS resource and a CSI reporting configuration (see step 250 in FIG. 4), the UE estimates an un-quantized explicit CSI using measurements on the downlink CSI-RS on PRBs, where the CSI-RS is configured over T consecutive time instants/slots in the frequency domain (see step 252 in FIG. 4).

Figure 7:
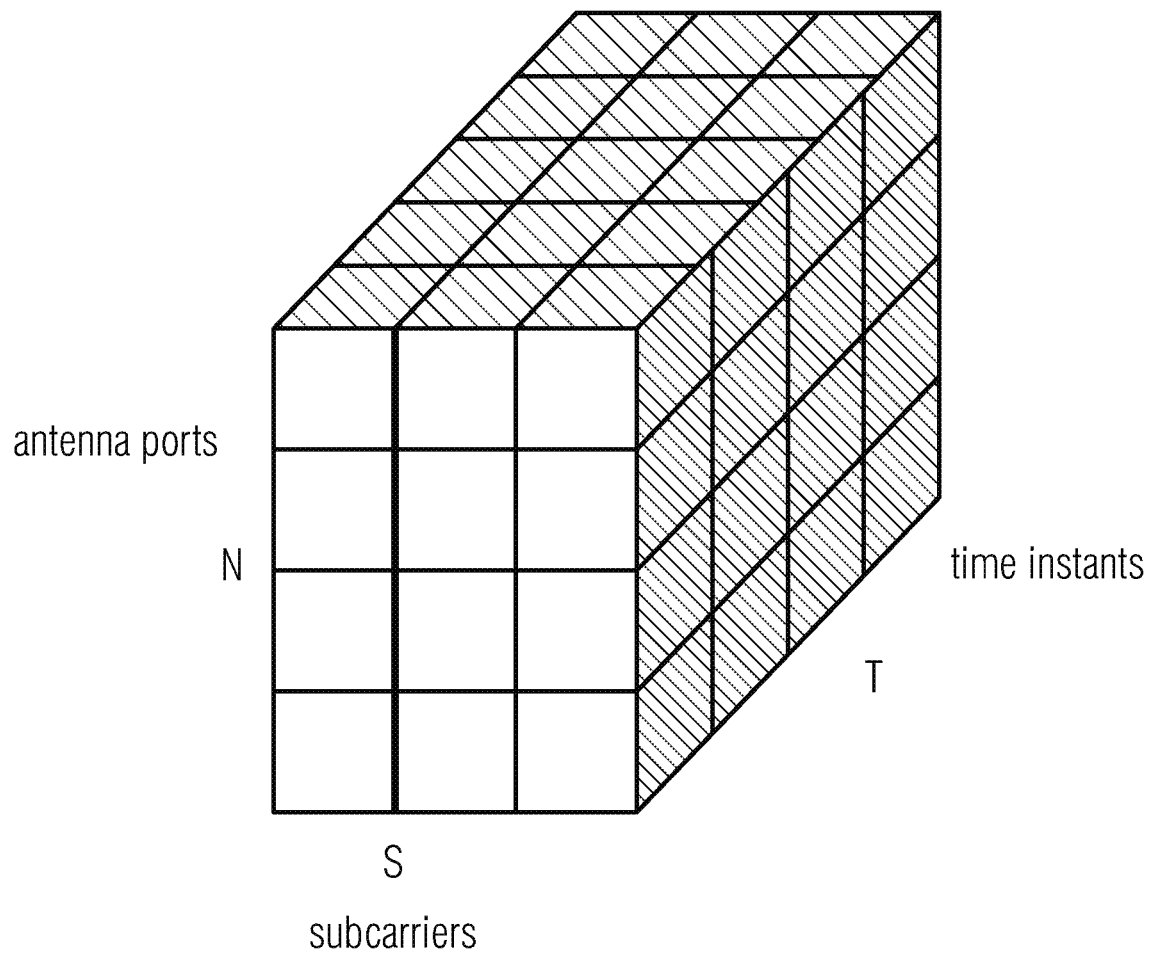
FIG. 7 illustrates a frequency-domain channel tensor (three-dimensional array) $\mathcal{H}$ of dimension N×S×T.

In accordance with embodiments, the explicit CSI is represented by a three-dimensional channel tensor (a three-dimensional array) $\mathcal{H} \in \mathbb{C}^{N \times S \times T}$ of dimension N×S×T with S being the number of configured sub-bands/PRBs, or subcarriers (see FIG. 7), and $N = N_r \cdot N_1 \cdot N_2 \cdot P$, where $N_r$ is the number of UE receive antennas. Here, the first, second and third dimension of the channel tensor represent the space, frequency, and time component of the time-variant frequency-selective MIMO channel, respectively.

In accordance with other embodiments, the explicit CSI is represented by a four-dimensional channel tensor $\mathcal{H} \in \mathbb{C}^{N_r \times N_t \times S \times T}$ of dimension $N_r \times N_t \times S \times T$, where $N_t = N_1 \cdot N_2 \cdot P$. Here, the first and second dimension of $\mathcal{H}$ represent the receive-side and transmit-side space components of the time-variant frequency-selective MIMO channel, respectively. The third and fourth dimension of $\mathcal{H}$ represent the frequency and time component of the MIMO channel, respectively.

In a next step, the UE calculates a CQI using the explicit CSI in the form of the channel tensor $\mathcal{H}$ and a composite Doppler-delay-beam three-stage precoder constructed using three separate codebooks:

- a first codebook $\Omega_1$ for the transmit-side space (beams) components of the Doppler-delay-beam precoder;
- a second codebook $\Omega_2$ for the delay components of the Doppler-delay-beam precoder; and
- a third codebook $\Omega_3$ for the Doppler-frequency components of the Doppler-delay-beam precoder.

In accordance with embodiments, instead of using three separate codebooks, the above mentioned beam, delay and Doppler-frequency components may be included into a single or common codebook, or two of the above mentioned beam, delay and Doppler-frequency components are included in one codebook, and the remaining component is included in another codebook.

Assuming a rank-L transmission, the composite Doppler-delay-beam three-stage precoder $W^{(l)}$ of dimension $N_t \cdot T \times S$ for the l-th layer (l=1, . . . , L) is represented by a (column-wise) Kronecker-product (assuming a dual-polarized transmit antenna array at the gNB) as $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix}, \quad (1)$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, and $f_{p,u,d,v}^{(l)}$ is the v-th Doppler-frequency vector of size T×1, selected from a codebook matrix $\Omega_3$, associated with the l-th layer, d-th delay, u-th spatial beam, and the p-th (p=1,2) polarization of the Doppler-delay-beam precoder;

$d_{p,u,d}^{(l)}$ is the d-th delay vector of size S×1, selected from a codebook matrix $\Omega_2$, associated with the l-th layer, u-th spatial beam and the p-th polarization of the Doppler-delay-beam precoder;

$b_u^{(l)}$ is the u-th spatial beam (polarization-independent) associated with the l-th layer selected from a codebook matrix $\Omega_1$;

$\gamma_{p,u,d,v}^{(l)}$ is the Doppler-delay coefficient associated with the l-th layer, u-th spatial beam, d-th delay, v-th Doppler-frequency and the p-th polarization of the Doppler-delay-beam precoder, and $P^{(l)}$ is a scalar normalization factor to ensure that the average total transmission power over all precoder layers is 1.

Figure 8:
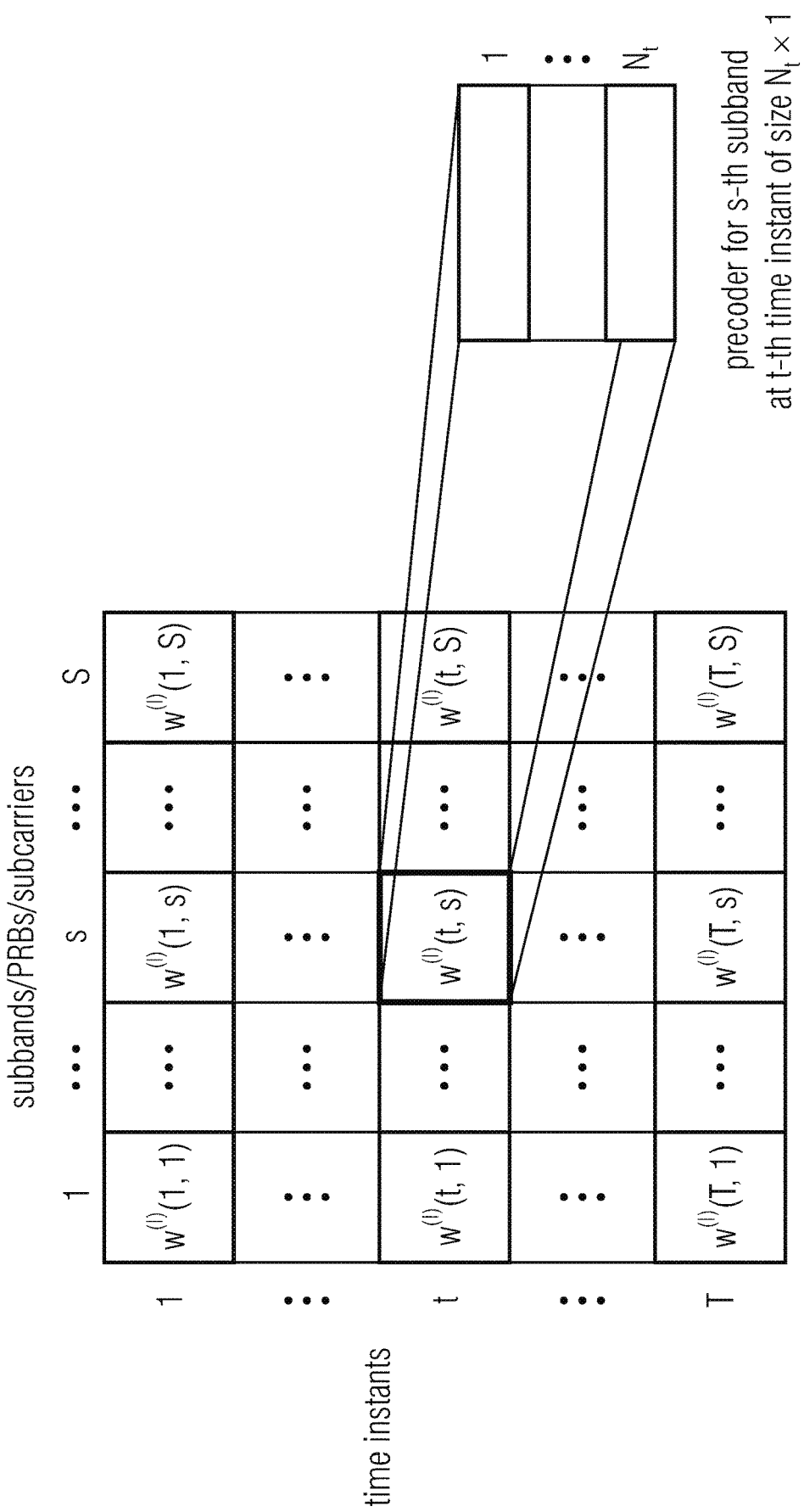
FIG. 8 illustrates a composite Doppler-delay-beam precoder matrix of size $N_t$·T×S.

A structure of the Doppler-delay-beam composite precoder matrix is shown in FIG. 8, which illustrates the composite Doppler-delay-beam precoder matrix of size $N_t \cdot T \times S$.

In accordance with other embodiments, the Doppler-delay-beam precoder may be expressed as a dual-stage precoder:

$$W^{(l)} = W^{(1,l)} w^{(2,l)} \in N_t \cdot T \cdot S \times 1,$$

where $$W^{(1,l)} = \begin{bmatrix} X_1 & 0 \\ 0 & X_2 \end{bmatrix}$$

with $$X_1 = \begin{bmatrix} f_{1,0,0,0}^{(l)} \otimes d_{1,0,0}^{(l)} \otimes b_0^{(l)} & \ldots & f_{1,u,d,v}^{(l)} \otimes d_{1,u,d}^{(l)} \otimes b_u^{(l)} & \ldots & f_{1,U^{(l)}-1,D_u^{(l)}-1,F_{d,u}^{(l)}-1}^{(l)} \otimes d_{1,U^{(l)}-1,D_u^{(l)}-1}^{(l)} \otimes b_{U^{(l)}-1}^{(l)} \end{bmatrix},$$

$$X_2 = \begin{bmatrix} f_{2,0,0,0}^{(l)} \otimes d_{2,0,0}^{(l)} \otimes b_0^{(l)} & \ldots & f_{2,u,d,v}^{(l)} \otimes d_{2,u,d}^{(l)} \otimes b_u^{(l)} & \ldots & f_{2,U^{(l)}-1,D_u^{(l)}-1,F_{d,u}^{(l)}-1}^{(l)} \otimes d_{2,U^{(l)}-1,D_u^{(l)}-1}^{(l)} \otimes b_{U^{(l)}-1}^{(l)} \end{bmatrix},$$

and $w^{(2,l)}$ contains the complex Doppler-delay-beam combining coefficients, $$w^{(2,l)} = [\gamma_{1,0,0,0}^{(l)} \quad . \quad . \quad . \quad \gamma_{1,u,d,v}^{(l)} \quad . \quad . \quad . \\ \gamma_{1,U^{(l)}-1,D_u^{(l)}-1,F_{d,u}^{(l)}-1}^{(l)} \gamma_{2,0,0,0}^{(l)} \ldots \gamma_{2,u,d,v}^{(l)} \ldots \\ \gamma_{2,U^{(l)}-1,D_u^{(l)}-1,F_{d,u}^{(l)}-1}^{(l)}]^T,$$

In accordance with embodiments, the values for the number of beams, delays, and Doppler-frequency components ($U^{(l)}$, $D_u^{(l)}$, $F_{d,u}^{(l)}$) are configured via a higher layer (e.g., RRC, or MAC) signaling or as a part of the DCI (physical layer signaling) in the downlink grant from the gNB to the UE. In accordance with another embodiments, the UE reports the advantageous values of ($U^{(l)}$, $D_u^{(l)}$, $F_{d,u}^{(l)}$) as a part of the CSI report. In accordance with other embodiments, the values of ($U^{(l)}$, $D_u^{(l)}$, $F_{d,u}^{(l)}$) are known a-priori by the UE.

Beam Configuration:

In accordance with embodiments, the number of beams $U^{(l)}$ may be configured to be non-identical over the layers. In accordance with other embodiments, the number of beams $U^{(l)}$ may be configured to be identical for all layers. In this case, $U^{(l)}=U$, $\forall l$. In accordance with other embodiments, the beam configuration may be a-priori known by the UE.

Delay Configuration:

In accordance with various embodiments, the delay components are configured in different ways, as will now be described.

In accordance with a first embodiment, the $D_u^{(l)}$ delay values, e.g., the indices of delay DFT-vectors, may differ for different beams, layers and polarizations.

In accordance with a second embodiment, the $D_u^{(l)}$ delay values, e.g., the indices of delay DFT-vectors, may differ for different beams and layers, but are identical for all polarizations.

In accordance with a third embodiment, the $D_u^{(l)}$ delay values, e.g., the indices of delay DFT-vectors, are identical for all beams, layers and polarizations.

In accordance with a fourth embodiment, the $D_u^{(l)}$ delay values, e.g., the indices of delay DFT-vectors, are identical for all beams and layers, but may differ over the polarizations.

In accordance with a fifth embodiment, the $D_u^{(l)}$ delay values, e.g., the indices of delay DFT-vectors, are identical for all beams and polarization indices, but may vary over the layers.

In accordance with a sixth embodiment, the $D_u^{(l)}$ delay values, e.g., the indices of delay DFT-vectors, are identical for all beams, but may vary over the layers and polarizations.

In accordance with a seventh embodiment, the number of delays $D_u^{(l)}$ depends on the beam and layer index.

In accordance with an eighth embodiment, the number of delays $D_u^{(l)}$ depends on the beam index, and remains identical for all layer indices, $D_u^{(l)}=D_u$, $\forall l, u$.

In accordance with a ninth embodiment, the number of delays $D_u^{(l)}$ is identical for all beam indices, but may vary per layer, $D_u^{(l)}=D^{(l)}$, $\forall l, u$.

In accordance with a tenth embodiment, the number delays $D_u^{(l)}$ is identical for all beam indices and layer indices, $D_u^{(l)}=D$ $\forall l, u$.

The delay components configuration as explained above may be configured via a higher layer (e.g., RRC, or MAC) signaling or may be configured as a part of DCI (physical layer signaling) in the downlink grant from the gNB to the UE. In accordance with other embodiments, the delay configuration may be a-priori known by the UE.

Doppler-Frequency Configuration:

In accordance with various embodiments, the Doppler-frequency components are configured in different ways, as will now be described.

In accordance with a first embodiment, the number of Doppler-frequency components $F_{d,u}^{(l)}$ depends on the beam index, delay index and layer index.

In accordance with a second embodiment, the number of Doppler-frequency components $F_{d,u}^{(l)}$ is identical for all beam, delays and layer indices, such that $F_{d,u}^{(l)}=F$, $\forall u, d, l$.

In accordance with a third embodiment, the number of Doppler frequency-components $F_{d,u}^{(l)}$ is identical for all beam indices and all delay indices, but may vary over the layer indices $F_{d,u}^{(l)}=F^{(l)}$, $\forall u, d, l$.

In accordance with a fourth embodiment, the number of Doppler frequency-vectors $F_{d,u}^{(l)}$ is identical for all beam indices, but it varies over delay and layer indices, $F_{d,u}^{(l)}=F_d^{(l)}$, $\forall u, d, l$.

In accordance with a fifth embodiment, the number of Doppler frequency-components $F_{d,u}^{(l)}$ is identical for all beam indices and layer indices, but it varies over delay indices, $F_{d,u}^{(l)}=F_d$, $\forall u,d,l$.

In accordance with a sixth embodiment, the number of Doppler frequency-components $F_{d,u}^{(l)}$ may be different for the U beams, and identical for all delay and layer indices, $F_{d,u}^{(l)}=F_u$, $\forall u, d, l$.

In accordance with a seventh embodiment, the number of Doppler-frequency-components $F_{d,u}^{(l)}$ is varying over beam and delay indices and identical for all layer indices, $F_{d,u}^{(l)}=F_{d,u}$, $\forall u, d, l$.

In accordance with an eighth embodiment, the number of Doppler frequency-components $F_{d,u}^{(l)}$ is varies over beam and layer indices, and is identical for all delay indices, $F_{d,u}^{(l)}=F_u^{(l)}$, $\forall u, d, l$.

In accordance with a ninth embodiment, the $F_{d,u}^{(l)}$ Doppler-frequency values (indices of Doppler-frequency DFT-vectors) may vary over the beams, delays, layers and polarizations.

In accordance with a tenth embodiment, the $F_{d,u}^{(l)}$ Doppler-frequency values (indices of Doppler-frequency DFT-vectors) may vary over the beams, delays, and layers, but are identical for all polarizations.

In accordance with an eleventh embodiment, the $F_{d,u}^{(l)}$ Doppler-frequency values are identical for all beams and delays, but may vary over the layers and polarizations.

In accordance with a twelfth embodiment, the $F_{d,u}^{(l)}$ Doppler-frequency values are identical for all beams, delays and polarizations, but may vary over the layers.

The Doppler-frequency components configuration as explained above may be configured via a higher layer (e.g., RRC, or MAC) signaling or may be configured as a part of DCI (physical layer signaling) in the downlink grant from the gNB to the UE. In accordance with other embodiments, the Doppler-frequency configuration may be a-priori known by the UE.

DFT-codebook matrix structure for $\Omega_1$, $\Omega_2$, and $\Omega_3$:

Embodiments for implementing the above mentioned codebooks are now described.

In accordance with embodiments, the vectors (spatial beams) $b_u^{(l)}$ are selected from an oversampled DFT-codebook matrix $\Omega_1$ of size $N_1 N_2 \times O_{1,1} N_1 O_{1,2} N_2$. The DFT-codebook matrix is parameterized by the two oversampling factors $O_{1,1} \in \{1, 2, 3, \ldots\}$ and $O_{1,2} \in \{1, 2, 3, \ldots\}$. The DFT-codebook matrix contains a set of vectors, where each vector is represented by a Kronecker product of a length-$N_1$ DFT-vector $$v_l = \left[1, e^{j\frac{2\pi l}{O_{1,1}N_1}}, \ldots, e^{j\frac{2\pi l(N_1-1)}{O_{1,1}N_1}}\right]^T,$$

$l=0, \ldots, O_{1,1}N_1-1$ corresponding to a vertical beam and a length-$N_2$ DFT-vector $$u_m = \left[1, e^{j\frac{2\pi m}{O_{1,2}N_2}}, \ldots, e^{j\frac{2\pi m(N_2-1)}{O_{1,2}N_2}}\right]^T,$$

$m=0, \ldots, O_{1,2}N_2-1$ corresponding to a horizontal beam.

The delay vectors $d_{u,d}^{(l)}$ may be selected from an oversampled DFT-codebook matrix $\Omega_2=[c_0, c_1, \ldots, c_{SO_2-1}]$ of size $S \times SO_2$. The DFT-codebook matrix $\Omega_2$ contains $SO_2$ vectors, where each vector is represented by a length-S DFT-vector $$c_l = \left[1, e^{j\frac{2\pi l}{O_2 S}}, \ldots, e^{j\frac{2\pi l(S-1)}{O_2 S}}\right]^T,$$

$l=0, \ldots, O_2 S-1$. Each entry in the codebook matrix is associated with a specific delay. The DFT-codebook matrix is parameterized by the oversampling factor $O_2=1, 2, \ldots$.

The Doppler-frequency vectors $f_{p,u,d,v}^{(l)}$ may be selected from an oversampled DFT-codebook matrix $\Omega_3=[a_0, a_1, \ldots, a_{TO_3-1}]$ of size $T \times TO_3$. The DFT-codebook matrix $\Omega_3$ contains $TO_3$ vectors, where each vector is represented by a length-T DFT-vector $$a_l = \left[1, e^{j\frac{2\pi l}{O_3 T}}, \ldots, e^{j\frac{2\pi l(T-1)}{O_3 T}}\right]^T,$$

$l=0, \ldots, O_3 T-1$. Each entry in the codebook matrix is associated with a specific Doppler-frequency. The DFT-codebook matrix is parameterized by the oversampling factor $O_3=1,2,\ldots$.

The oversampled factors $O_{1,1}, O_{1,2}, O_2, O_3$ of the DFT-codebook matrices may be configured via a higher layer (e.g., RRC, or MAC) signaling or may be configured as a part of the DCI (physical layer signaling) in the downlink grant from the gNB to the UE. Alternatively, the oversampled factors $O_{1,1}, O_{1,2}, O_2, O_3$ of the DFT-codebook matrices may be known by the UE.

UE-Side Selection of W:

The UE selects an advantageous Doppler-delay precoder matrix W based on a performance metric (see step 256 in FIG. 4).

In accordance with embodiments, the UE selects the precoder matrix W that optimizes the mutual-information I(W; $\mathcal{H}$), which is a function of the Doppler-delay precoder matrix W and the multi-dimensional channel tensor $\mathcal{H}$, for each configured SB, PRB, or subcarrier.

In accordance with other embodiments, the U spatial beams, Doppler frequencies and delays are selected stepwise. For example, for a rank-1 transmission, in a first step, the UE selects the U spatial beams that optimize the mutual information:

$$\hat{b}_1^{(1)}, \ldots, \hat{b}_U^{(1)} = \arg\max I(\mathcal{H}; b_1^{(1)}, \ldots, b_U^{(1)}) \text{(for rank 1)}.$$

In a second step, the UE calculates the beam-formed channel tensor $\tilde{\mathcal{H}}$ of dimension $2UN_F \times S \times T$ with the U spatial beams $\hat{b}_1^{(1)}, \ldots, \hat{b}_U^{(1)}$.

In a third step, the UE selects three-tuples of Doppler-frequency DFT-vectors, delay DFT-vectors and Doppler-delay-beam combining coefficients, where the Doppler-frequency and delay DFT-vectors are selected from the codebooks $\Omega_3$ and $\Omega_2$, respectively, such that the mutual information $I(\mathcal{H}; W|\hat{b}_1^{(1)}, \ldots, \hat{b}_U^{(1)})$ is optimized.

UE-Side Selection of RI:

In accordance with embodiments, the UE may select the rank indicator, RI, for reporting (see step 258 in FIG. 4). When RI reporting is configured at the UE, the UE reports a rank indicator (total number of layers) for the transmission. The rank indicator is selected with respect to the Doppler-delay-beam precoder matrix $W^{(l)}$ (l=1, ..., L) (see equation (1) above), and denotes the average number of layers supported by the Doppler-delay-beam precoded time-variant frequency-selective MIMO channel.

UE-Side Selection of CQI:

In accordance with embodiments, the UE may select the channel quality indicator, CQI, for reporting (see step 258 in FIG. 4). When CQI reporting is configured at the UE, the UE reports an advantageous CQI based on a specific performance metric such as signal-to-interference and noise ratio (SINR), average bit error rate, average throughput, etc.

For example, the UE may select the CQI that optimizes the average block error rate block_error_rate($\mathcal{H}$ |$W^{(l)}$ (l=1, ..., L)) at the UE for the selected composite Doppler-delay-beam precoder matrix $W^{(l)}$ (l=1, ..., L) (see equation (1) above) and a given multi-dimensional channel tensor $\mathcal{H}$ for the for the T time instants. The CQI value represents an "average" CQI supported by the Doppler-delay-beam precoded time-variant frequency-selective MIMO channel.

Moreover, in accordance with other embodiment, a CQI (multiple CQI reporting) for each configured SB may be reported using the selected composite Doppler-delay-beam precoder matrix $W^{(l)}$ (=1, ..., L) (see equation (1) above) and a given multi-dimensional channel tensor $\mathcal{H}$ for the T time instances.

PMI Reporting:

In accordance with embodiments, the UE may select the precoder matrix indicator, PMI, for reporting (see step 258 in FIG. 4). When PMI reporting is configured at the UE, the UE reports at least a two-component PMI.

The first PMI component may correspond to the selected vectors $b_u^{(l)}$, $d_{p,u,d}^{(l)}$ and $f_{p,u,d,v}^{(l)}$, and may be represented in the form of three-tuple' sets, where each three-tuple (u,d,v) is associated with a selected spatial beam vector $b_u^{(l)}$, a selected delay vector $d_{p,u,d}^{(l)}$, and a selected Doppler-frequency vector $f_{p,u,d,v}^{(l)}$. For example, the three-tuple' sets may be represented by $i_1=[i_{1,2}, i_{1,2}, i_{1,3}]$ for a rank-1 transmission. Here, $i_{1,1}$ contains $\Sigma_l U^{(l)}$ indices of selected DFT-vectors for the spatial beams, $i_{1,2}$, contains $2\Sigma_{u,l}D_u^{(l)}$ indices of selected delay-vectors, and $i_{1,3}$ contains $2\Sigma_{u,d,l}F_{d,u}^{(l)}$ indices of selected Doppler-frequency-vectors.

Figure 9:
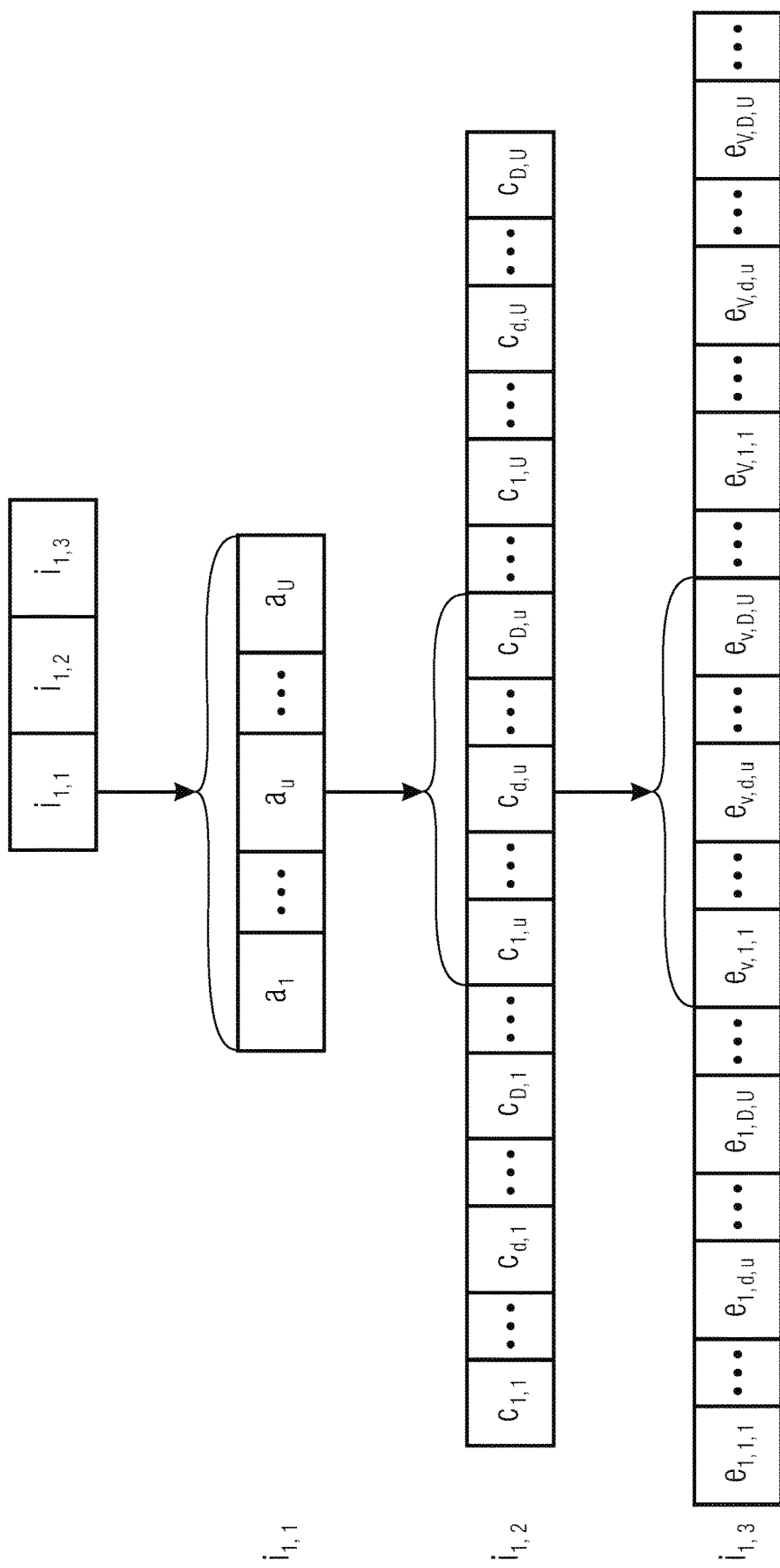
FIG. 9 illustrates feedback indices associated with a beam, delay and Doppler-frequency components for a layer-1 transmission assuming equal number of delays per beam and equal number of Doppler-frequency components per delay and beam.

FIG. 9 illustrates feedback indices associated with a beam, delay and Doppler-frequency components for a layer-1 transmission assuming equal number of delays per beam $D_u^{(l)}=D$, $\forall u$, and equal number of Doppler-frequency components per delay and beam $F_{d,u}^{(l)}=V$, $\forall d$, u.

FIG. 9 illustrates feedback indices associated with a beam, delay and Doppler-frequency components for a layer-1 transmission assuming equal number of delays per beam $D_u^{(l)}=D$, $\forall u$, and equal number of Doppler-frequency components per delay and beam $F_{d,u}^{(l)}=V$, $\forall d$, u. FIG. 9 shows an example for $i_1$ for a layer-1 transmission. The subset $i_{1,1}$ of $i_1$ represents the beam indices selected from the codebook $\Omega_1$ and are denoted by $a_u$, $\forall u$. The subset $i_{1,2}$ of $i_1$ represents the delay indices selected from the codebook $\Omega_2$ and are denoted by $c_{d, u}$, $\forall d$, u. The subset $i_{1,3}$ of $i_1$ represents the selected Doppler-frequency indices from the codebook $\Omega_3$ and are denoted by $e_{v,d,u}$, $\forall v, d, u$.

In accordance with embodiments, to report the 2 $\Sigma_{u,d,l} F_{d,u}^{(l)}$ Doppler-delay-beam combining coefficients $\gamma_{p,u,d,v}^{(l)}$ from the UE to the gNB, the UE may quantize the coefficients using a codebook approach. The quantized combining coefficients are represented by $i_2$, the second PMI. The two PMIs are reported to the gNB.

The large-scale channel parameters such as path loss and shadow fading do not change quickly over time, and the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams, the precoder Doppler-frequency DFT-vectors, the delay DFT-vectors as well as the Doppler-delay coefficients of the Doppler-delay-beam three-stage precoder $W^{(l)}$ remain identical for a long time period, and need to be less frequently updated.

Figure 10:
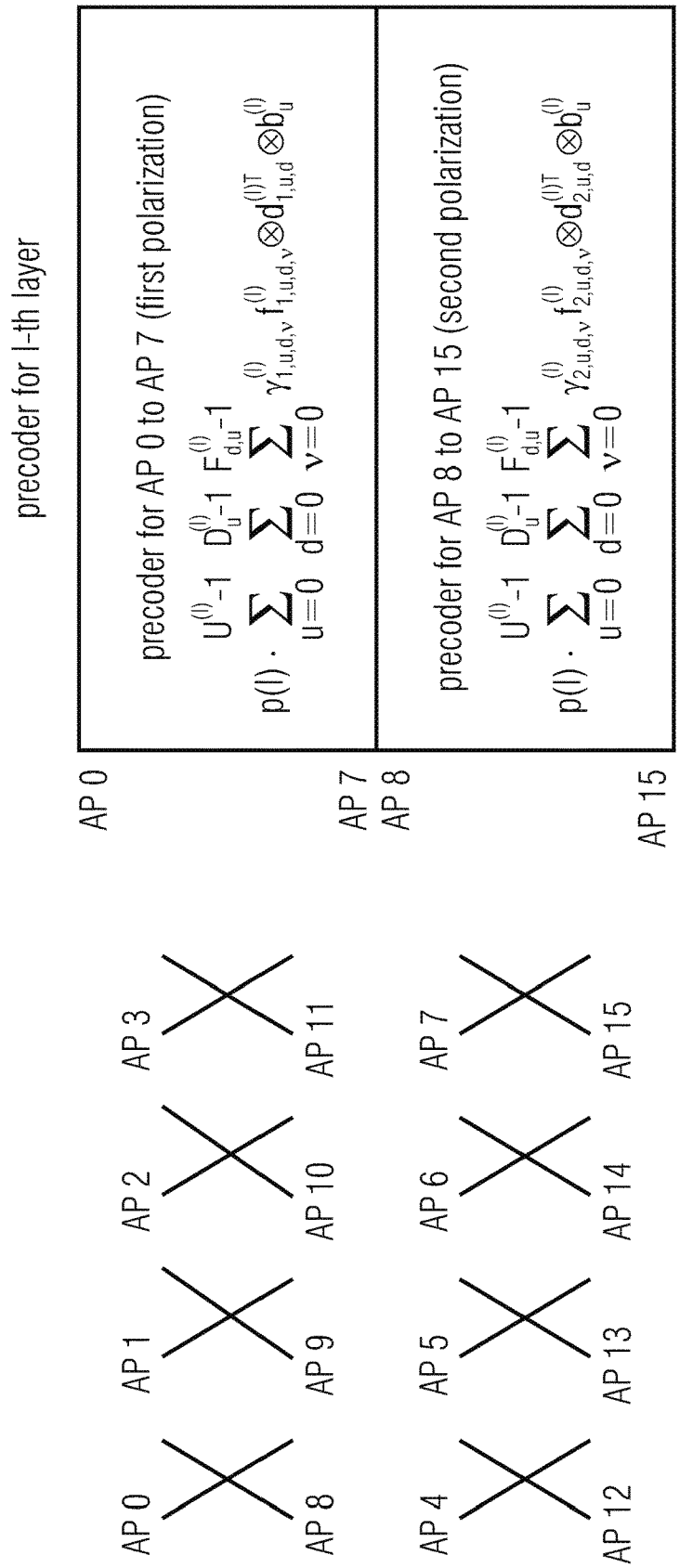
FIG. 10 illustrates a codebook based construction of the l-th layer precoder at the gNB and the association of the l-th layer precoder with the antenna ports (AP) for an example configuration $N_1=4$, $N_2=2$, $P=2$.

Precoder Construction at the gNB:

In accordance with embodiments, the gNB may use the two-component PMI feedback from the UE to construct the precoder matrix according to the codebook-based construction shown in FIG. 10, which illustrates a codebook based construction of the l-th layer precoder at the gNB and the association of the l-th layer precoder with the antenna ports (AP) for an example configuration $N_1=4$, $N_2=2$, $P=2$. The precoder matrix information is used to calculate a multi-user precoding matrix which is applied to the transmission signals to adapt the transmission parameters to the current multiuser channel conditions. The above Doppler-delay composite Kronecker-based precoder matrix definition also facilitates the prediction of precoder matrices for future time instances. In this way, the number of CSI reports may be drastically reduced and feedback overhead is saved.

To facilitate precoder matrix prediction for QT future time instants, the Doppler-frequency DFT-vectors $f_{p,u,d,v}^{(l)}$ may be cyclically extended to length-QT vectors $t_{p,u,d,v}^{(l)}$. The cyclic extension is defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3.$ The predicted precoder matrix for the l-th layer and q-th (q=1, ..., QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} t_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} t_{2,u,d,v}^{(l)}(q) \otimes d_{2,u,d}^{(l)T} \otimes b_u^{(l)} \end{bmatrix}$$

where $t_{p,u,d,v}^{(l)}(q)$ is the q-th entry of $t_{p,u,d,v}^{(l)}$.

The predicted precoding matrices may be used in predictive multi-user scheduling algorithms that attempt to optimize, for example, the throughput for all users by using the knowledge of current and future precoder matrices of the users.

Codebook for Doppler-Delay Combining Coefficients:

In accordance with embodiments the UE may be configured to quantize the complex Doppler-delay coefficients $f_{p,u,d,v}^{(l)}$ with a codebook approach. Each coefficient is represented by $$\gamma_{p,u,d,v}^{(l)} = \hat{\gamma}_{p,u,d,v}^{(l)} \phi_{p,u,d,v}^{(l)},$$

where $\hat{\gamma}_{p,u,d,v}^{(l)}$ is a polarization-, beam-, delay- and Doppler-frequency-dependent amplitude coefficient which is quantized with N bits; and $\phi_{p,u,d,v}^{(l)}$ represents a phase which is represented by a BPSK, or QPSK, or 8PSK, and any higher-order constellation.

In accordance with other embodiments, each coefficient may be represented by its real and imaginary part as $$\gamma_{p,u,d,v}^{(l)} = \text{Re}\{\hat{\gamma}_{p,u,d,v}^{(l)}\} + j\text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{p,u,d,v}^{(l)}\}$ are quantized each with N bits;

Extension to CQI Value Prediction:

In accordance with further embodiments the UE may be configured to predict a CQI value for time-instant/slot "n+K", where n denotes the current time-instant/slot, and K denotes the relative time difference with respect to the current time-instant/slot n.

In one embodiment, the UE uses in a first step a high resolution parameter estimation algorithm, such as RIMAX (see reference [5]), to estimate parameters of a channel model directly from the multi-dimensional channel tensor $\mathcal{H}$. For example, the time-variant MIMO channel model impulse response may be defined by a number of channel taps, where each channel tap is parameterized with a channel gain, Doppler-frequency shift and a delay. The time-variant frequency-selective MIMO channel model frequency-domain response between the i-th gNB antenna and the j-th UE antenna may be expressed by $$h_{i,j}(t, w) = \sum_{m=0}^{M-1} h_{i,j}(m) e^{j2\pi f_m t} e^{-j\frac{2\pi w \tau_m}{W}},$$

where

M is the number of channel delays, $h_{i,j}(m)$ is the m-th path gain with associated Doppler-frequency shift $f_m$ and channel delay $\tau_m$, t represent the time instant, w denotes the subcarrier index, and W denotes the total number of subcarriers.

In the present example, a non-polarimetric channel model is assumed, where the channel delays are identical for all links (i,j) of the MIMO channel.

It is noted that the coefficients of H(t,w) may also be calculated directly in a non-parameterized form from the MIMO channel tensor $\mathcal{H}$ by using a linear block-filtering approach such as least squares or minimum-mean-squared-error (MMSE) filtering (see references [6] and [7]). In this case, the channel predictor is formed by a weighted sum of the MIMO channel tensor $\mathcal{H}$.

In a second step, the parameterized channel model and the selected Doppler-delay-beam composite precoder $W^{(l)}$ (l=1, ..., L) (see equation (1) above) are used to calculate a parameterized precoded time-variant MIMO channel model frequency-domain response as $$H_{prec}(t,w) = H(t,w)[W^{(1)}(t,w), W^{(2)}(t,w), \ldots, W^{(L)}(t,w)],$$

where the (i,j) entry of $[H(t,w)]_{i,j}=h_{i,j}(t,w)$, and $W^{(l)}(t,w)$ is the t-th block and w-th column of WC (see FIG. 8).

In a third step, the UE uses the parameterized precoded MIMO channel model response to calculate a CQI value for a future time instant n+K, i.e., the CQI(n+K) is expressed as a function of $H_{prec}(n+K,w)$.

In accordance with further embodiments, the UE may use the above parameterized precoded MIMO channel response also to predict K future CQI values (multiple CQI reporting) for the "n+k" (k=0, . . . , K) future time instants. The K predicted CQI values may be used to calculate differential predicted CQI values by reducing the K predicted CQI values by the "average" CQI value. The predicted single CQI value, or predicted K CQI values, or predicted K differential CQI values is/are reported to the gNB.

As mentioned above, other embodiments operating on the basis of repeated downlink reference signals may use other precoders or other techniques to determine the CSI feedback based on the repeated downlink reference signals and to report determine the CSI feedback. Thus, further embodiments of the present invention provide a communication device for providing a channel state information, CSI, feedback in a wireless communication system, wherein the communication device receives a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in. The communication device determines the CSI feedback based on the repeated downlink reference signals and reports the determined CSI feedback.

Extension to Port-Selection Codebook:

In accordance with embodiments the UE may be configured with a CSI-RS reporting configuration via a higher layer for reporting a CQI, RI and PMI (if configured) for beam-formed CSI-RS. In this case, the vectors in the first codebook matrix are represented by $N_1N_2$-length column vectors, where the m-th vector (m=1, . . . , $N_1N_2$) contains a single 1 at the m-th position and zeros elsewhere.

Precoder Application at gNB:

In accordance with embodiments the UE may assume that, for CQI, and/or RI, and/or PMI calculation, the gNB applies the Doppler-delay-beam precoder calculated with respect to equation (1) above, to the PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = W(t,i) \begin{bmatrix} x^{(t,0)}(i) \\ \vdots \\ x^{(t,v-1)}(i) \end{bmatrix},$$

where $[x^{(t,0)}(i), \ldots, x^{(t,v-1)}(i)]^T$ is a symbol vector of PDSCH symbols from the layer mapping defined in Subclause 7.3.1.4 of TS 38.211 [1], P∈{1,2, 4, 8, 12, 16, 24, 32}, $x^{(t,u)}(i)$ is the i-th symbol of layer u at time instant t, $y^{(t,u)}(i)$ is the precoded symbol transmitted on antenna port u at time instant t, and $W(t,i)=[W^{(1)}(t,i), \ldots, W^{(L)}(t,i)]$ is the predicted precoder matrix calculated according to equation (1) with $W^{(l)}(t,i)$ being the t-th block and i-th column of $W^{(l)}$.

The corresponding PDSCH signals $[y^{(t,3000)}(i) \ldots y^{(t,3000+P-1)}(i)]$ transmitted on antenna ports [3000,3000+P− 1] have a ratio of, energy per resource element, EPRE, to CSI-RS EPRE equal to the ratio given in Subclause 4.1 of TS 38.214 [2].

It is noted that for the current PDSCH transmission scheme as described in [2] the precoder matrix is kept constant over time until it is updated by a reported PMI. In contrast, the approach in accordance with embodiments takes into account the channel variations by updating the precoder matrix continuously over time without instantaneous PMI reporting.

In accordance with embodiments, the UE may be configured with the parameter T=1 for the configuration of the Doppler-frequency component codebook $\Omega_3$, such that the Doppler-frequency component codebook is given by the scalar value 1 and the Doppler-delay precoder matrix (W) and the corresponding PMI are based or include a first codebook for the one or more transmit-side spatial beam components and a second codebook for the one or more delay components of the Doppler-delay precoder matrix (W).

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator.

In accordance with embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

The embodiments of the present invention have been described above with reference to a communication system employing a rank 1 or layer 1 communication. However, the present invention is not limited to such embodiments and may also be implemented in a communication system employing a higher rank or layer communication. In such embodiments, the feedback includes the delays per layer and the complex precoder coefficients per layer.

The embodiments of the present invention have been described above with reference to a communication system in which the transmitter is a base station serving a user equipment, and the communication device or receiver is the user equipment served by the base station. However, the present invention is not limited to such embodiments and may also be implemented in a communication system in which the transmitter is a user equipment station, and the communication device or receiver is the base station serving the user equipment. In accordance with other embodiments, the communication device and the transmitter may both be UEs communicating via directly, e.g., via a sidelink interface.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 11:
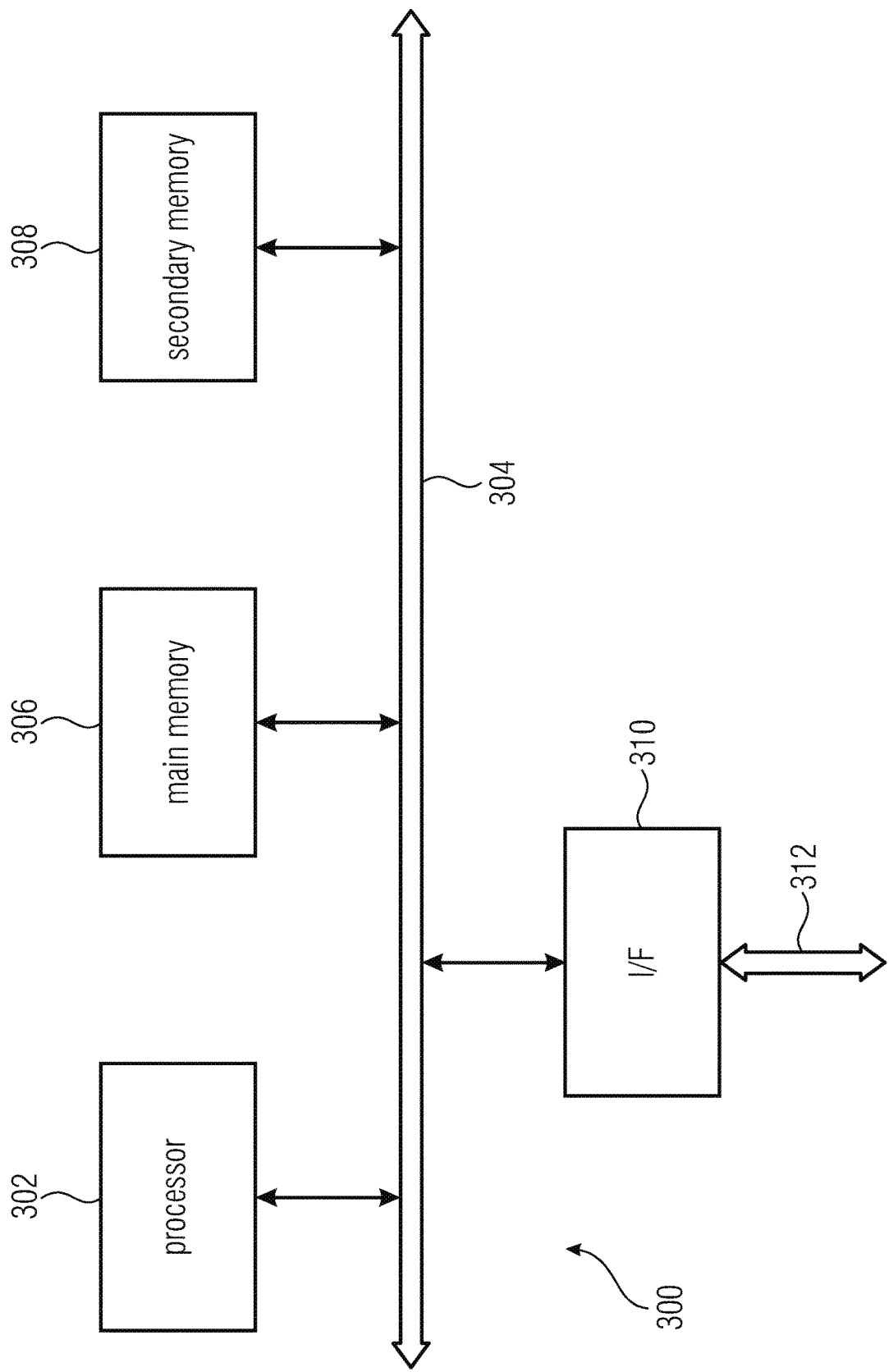
FIG. 11 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 11 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TS 38.211 V15.1.0, "3rd Generation Partnership Project; Technical Specification Group Radio Access Network; NR; Physical channels and modulation (Release 15), March 2018.

[2] 3GPP TS 38.214 V15.1.0, "3rd Generation Partnership Project; Technical Specification Group Radio Access Network: NR; Physical layer procedures for data (Release 15), March 2018.

[3] K. Manolakis, S. Jaeckel, V. Jugnickel, and V. Braun, "Channel Prediction by Doppler-Delay Analysis and Benefits for Base Station Cooperation," in 77th IEEE Vehicular Technology Conference, June 2013.

[4] 3GPP TS 38.331 V15.1.0, "3rd Generation Partnership Project; Technical Specification Group Radio Access Network; NR; Radio Resource Control (RRC); Protocol specification (Release 15), March 2018.

[5] R. S. Thomä, M. Landmann, and A. Richter, "RIMAX-A maximum likelihood framework for parameter estimation in multidimensional channel sounding." Proceedings of the International Symposium on Antennas and Propagation (ISAP'04). 2004.
[6] I. Barhumi, G. Leus, and M. Moonen, "Optimal training design for MIMO OFDM systems in mobile wireless channels," IEEE Trans. Signal Process, vol. 51, no. 6, pp. 1615-1624, June 2003.
[7] P. Hoeher, S. Kaiser, and P. Robertson, "Two-dimensional pilot-symbol-aided channel estimation by Wiener filtering," in Proc. IEEE ICASSP-97, Munich, Germany, April 1997, pp. 1845-1848.

The invention claimed is:

1. A communication device for providing a channel state information, CSI, feedback in a wireless communication system, the communication device comprising:
    a transceiver configured to receive, from a transmitter a radio signal via a MIMO channel, the radio signal comprising downlink reference signals according to a reference signal configuration comprising a number of antenna ports, and downlink signals comprising the reference signal configuration; and
    a processor configured to
        estimate an CSI using measurements on the downlink reference signals on the radio channel, the downlink reference signals provided over a certain observation time,
        select, based on a performance metric, a Doppler-delay precoder matrix for a composite Doppler-delay-beam three-stage precoder, the Doppler-delay-beam three-stage precoder being based on one or more codebooks, the one or more codebooks comprising
        one or more transmit-side spatial beam components of the composite Doppler-delay-beam three-stage precoder,
        one or more delay components of the composite Doppler-delay-beam three-stage precoder, and
        one or more Doppler-frequency components of the composite Doppler-delay-beam three-stage precoder,
        determine either one or more of a channel quality indicator, CQI, and/or a precoder matrix indicator, PMI, and/or a rank indicator, RI, using the composite Doppler-delay-beam three-stage precoder with the selected Doppler-delay-beam precoder matrix, and
        report to the transmitter the CSI feedback comprising either one or more of the CQI, and/or the PMI and/or the RI, wherein the PMI and RI are used to indicate the Doppler-delay-beam three-stage composite precoder matrix for the configured antenna ports.

2. The communication device of claim 1, wherein the Doppler-delay-beam three-stage precoder is based on three separate codebooks, and wherein the three separate codebooks comprise
    a first codebook for the one or more transmit-side spatial beam components of the composite Doppler-delay-beam three-stage precoder,
    a second codebook for the one or more delay components of the composite Doppler-delay-beam three-stage precoder, and
    a third codebook for the one or more Doppler-frequency components of the composite Doppler-delay-beam three-stage precoder.

3. The communication device of claim 1, wherein the Doppler-delay precoder matrix W is represented by $$W^{(l)} = p^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix},$$

where
$U^{(l)}$ is the number of beams per polarization for the l-th layer,
$D_u^{(l)}$ is the number of delays for the l-th layer and u-th beam,
$F_{d,u}^{(l)}$ is the number of Doppler-frequency components for the l-th layer, u-th beam and d-th delay,
$f_{p,u,d,v}^{(l)}$ is the v-th Doppler-frequency vector of size T×1 associated with the l-th layer, d-th delay, u-th spatial beam, and the p-th (p=1,2) polarization of the precoder;
$d_{p,u,d}^{(l)}$ is the d-th delay vector of size S×1 associated with the l-th layer, u-th spatial beam and the p-th polarization of the precoder;
$b_u^{(l)}$ is the u-th spatial beam associated with the l-th layer;
$\gamma_{p,u,d,v}^{(l)}$ is the Doppler-delay coefficient associated with the l-th layer, u-th spatial beam, d-th delay, v-th Doppler-frequency and the p-th polarization of the precoder, and
$p^{(l)}$ is a scalar normalization factor to ensure that the average total transmission power over all precoder layers is 1.

4. The communication device of claim 1, wherein the Doppler-delay-beam precoder is represented by a dual-stage precoder:

$$W^{(l)} = W^{(1,l)} w^{(2,l)} \in N_t \cdot T \cdot S \times 1,$$

where $$W^{(1,l)} = \begin{bmatrix} X_1 & 0 \\ 0 & X_2 \end{bmatrix} \text{ with}$$

$$X_1 = \begin{bmatrix} f_{1,0,0,0}^{(l)} \otimes d_{1,0,0}^{(l)} \otimes b_0^{(l)} & \cdots & f_{1,u,d,v}^{(l)} \otimes d_{1,u,d}^{(l)} \otimes b_u^{(l)} & \cdots & f_{1,U^{(l)}-1,D_u^{(l)}-1,F_{d,u}^{(l)}-1}^{(l)} \otimes d_{1,U^{(l)}-1,D_u^{(l)}-1}^{(l)} \otimes b_{U^{(l)}-1}^{(l)} \end{bmatrix},$$

$$X_2 = \begin{bmatrix} f_{2,0,0,0}^{(l)} \otimes d_{2,0,0}^{(l)} \otimes b_0^{(l)} & \cdots & f_{2,u,d,v}^{(l)} \otimes d_{2,u,d}^{(l)} \otimes b_u^{(l)} & \cdots & f_{2,U^{(l)}-1,D_u^{(l)}-1,F_{d,u}^{(l)}-1}^{(l)} \otimes d_{2,U^{(l)}-1,D_u^{(l)}-1}^{(l)} \otimes b_{U^{(l)}-1}^{(l)} \end{bmatrix},$$

and $w^{(2,l)}$ comprises the complex Doppler-delay-beam combining coefficients, $$w^{(2,l)} = \left[ \gamma_{1,0,0,0}^{(l)} \cdots \gamma_{1,u,d,v}^{(l)} \cdots \gamma_{1,U^{(l)}-1,D_u^{(l)}-1,F_{d,u}^{(l)}-1}^{(l)} \; \gamma_{2,0,0,0}^{(l)} \cdots \gamma_{2,u,d,v}^{(l)} \cdots \gamma_{2,U^{(l)}-1,D_u^{(l)}-1,F_{d,u}^{(l)}-1}^{(l)} \right]^T ,$$

where
$f_{p,u,d,v}^{(l)}$ is the v-th Doppler-frequency vector of size T×1 associated with the l-th layer, d-th delay, u-th spatial beam, and the p-th (p=1,2) polarization of the precoder;
$d_{p,u,d}^{(l)}$ is the d-th delay vector of size S×1 associated with the l-th layer, u-th spatial beam and the p-th polarization of the precoder;
$b_u^{(l)}$ is the u-th spatial beam associated with the l-th layer;
$\gamma_{p,u,d,v}^{(l)}$ is the Doppler-delay coefficient associated with the l-th layer, u-th spatial beam, d-th delay, v-th Doppler-frequency and the p-th polarization of the precoder, and
$p^{(l)}$ is a scalar normalization factor to ensure that the average total transmission power over all precoder layers is 1.

5. The communication device of claim 1, wherein
the first codebook comprises a first oversampled DFT-based codebook matrix of size $N_1N_2 \times O_{1,1}N_1O_{1,2}N_2$ from which the vectors $b_u^{(l)}$ are selected, where $N_1$ and $N_2$ refer to the first and second numbers of antenna ports, respectively, and $O_{1,1}$ and $O_{1,2}$ refer to the oversampling factors with $O_{1,1} \varepsilon \{1,2,3, \ldots \}$ and $O_{1,2} \varepsilon \{1,2,3, \ldots \}$, and
wherein the second codebook comprises a second oversampled DFT-based codebook matrix of size $S \times SO_2$ from which the delay vectors $d_{u,d}^{(l)}$ are selected, where S refers to the number of configured sub-bands/PRBs, or subcarriers, and $O_2$ refers to the oversampling factor $O_2 = 1, 2, \ldots$.

6. The communication device of claim 1, wherein
the first codebook comprises a first oversampled DFT-based codebook matrix of size $N_1N_2 \times O_{1,1}N_1O_{1,2}N_2$ from which the vectors $b_u^{(l)}$ are selected, where $N_1$ and $N_2$ refer to the first and second numbers of antenna ports, respectively, and $O_{1,1}$ and $O_{1,2}$ refer to the oversampling factors with $O_{1,1}\varepsilon\{1, 2, 3, \ldots \}$ and $O_{1,2} \varepsilon\{1, 2, 3, \ldots \}$,
wherein the second codebook comprises a second oversampled DFT-based codebook matrix of size $S \times SO_2$ from which the delay vectors $d_{u,d}^{(l)}$ are selected, where S refers to the number of configured sub-bands/PRBs, or subcarriers, and $O_2$ refers to the oversampling factor $O_2 = 1, 2, \ldots$, and
wherein the third codebook comprises a third oversampled DFT-based codebook matrix of size $T \times TO_3$ from which the Doppler-frequency vectors $f_{p,u,d,v}^{(l)}$ are selected, where T refers to the number of time instances during the observation time, and $O_3$ refers to the oversampling factor with $O_3=1, 2, \ldots$.

7. The communication device of claim 1, wherein the communication device is configured to report to the transmitter the CSI feedback according to a CSI reporting configuration received from the transmitter, the CSI reporting configuration comprising, for example, the parameter ReportQuantity, which comprises at least one the following values:
cri-RI-PMIDD-CQI,
cri-RI-PMIDy-CQI,
cri-RI-PMIDr-CQI,
cri-RI-LI-PMIDD-CQI,
cri-RI-LI-PMIDy-CQI,
cri-RI-LI-PMIDr-CQI,
cri-RI-PMIDD,
cri-RI-PMIDy,
cri-RI-PMIDr,
wherein the PMI quantities are defined as:
PMIDD-PMI values comprising the delay and the Doppler-frequency component configurations,
PMIDy-PMI values comprising only the delay component configuration, excluding the Doppler-frequency component(s), and
PMIDr-PMI values comprising only the Doppler-frequency component configuration, excluding the delay component(s).

8. The communication device of claim 1, wherein the communication device is configured to receive the following values from the transmitter using Radio Resource Control (RRC) layer or physical layer parameters:
values of S for the configuration of the delay component codebook, and
parameters $N_1$, $N_2$ for the configuration of the first codebook.

9. The communication device of claim 1, wherein the communication device is configured to receive the following values from the transmitter using Radio Resource Control layer or physical layer parameters:
values of S and T for the configuration of the delay and Doppler-frequency component codebooks, and
parameters $N_1$, $N_2$ and oversampling factors $O_{1,1}$ and $O_{1,2}$ for the configuration of the first codebook.

10. The communication device of claim 1, wherein the spatial beam components are configured as follows:
the number of beams $U^{(l)}$ is non-identical over the layers, or
the number of beams $U^{(l)}$ is identical for all layers such that $U^{(l)}=U, \forall l$.

11. The communication device of claim 1, wherein the delay components are configured as follows:
the $D_u^{(l)}$ delay values, e.g., the indices of delay DFT vectors, may vary for each beam, layer and polarization indices,
the $D_u^{(l)}$ delay values, e.g., the indices of delay DFT vectors, vary for each beam and layer indices and may remain identical over the polarization indices,
the $D_u^{(l)}$ delay values, e.g., the indices of delay DFT vectors, are identical for all beam, layer and polarizations indices
the $D_u^{(l)}$ delay values, e.g., the indices of delay DFT vectors, are identical for all beam and layer indices and may over polarization indices,
the $D_u^{(l)}$ delay values, e.g., the indices of delay DFT vectors, are identical for all beam and polarization indices, and vary over the layer indices,
the $D_u^{(l)}$ delay values, e.g., the indices of delay DFT vectors, are identical for all beam indices, and vary over the layer and polarization indices,
the number of delays $D_u^{(l)}$ depends on the beam and layer index, or the number of delays $D_u^{(l)}$ depends on the beam index, and remains identical for all layer indices, $D_u^{(l)} = D_u, \forall l$, u, or the number of delays $D_u^{(l)}$ is identical for all beam indices, but varies per layer, $D_u^{(l)} = D^{(l)}, \forall l$, u, or the number delays $D_u^{(l)}$ is identical for all beam indices and layer indices, $D_u(l) = D \; \forall l$, u.

12. The communication device of claim 1, wherein the Doppler-frequency components are configured as follows:

the $F_{d,u}^{(l)}$ Doppler-frequency values, e.g., the indices of Doppler-frequency DFT-vectors, vary over beam, delay, layer and polarization indices, the $F_{d,u}^{(l)}$ Doppler-frequency values, e.g., the indices of Doppler-frequency DFT-vectors, vary over beam, delay, layer indices but remain identical over polarization indices, the $F_{d,u}^{(l)}$ Doppler-frequency values, e.g., the indices of Doppler-frequency DFT-vectors, are identical for all beam and delay indices, and may vary over layer and polarization indices, the $F_{d,u}^{(l)}$ Doppler-frequency values, e.g., the indices of Doppler-frequency DFT-vectors, are identical for all beam, delay and polarization indices, and may vary over layer indices, the number of Doppler-frequency components $F_{d,u}^{(l)}$ depends on the beam index, delay index and layer index, or the number of Doppler-frequency components $F_{d,u}^{(l)}$ is identical for all beam, delays and layer indices, such that $F_{d,u}^{(l)} = F, \forall u, d, l$, or the number of Doppler frequency-components $F_{d,u}^{(l)}$ is identical for all beam indices and all delay indices, but varies over the layer indices $F_{d,u}^{(l)} = F^{(l)}, \forall u, d, l$, or the number of Doppler frequency-vectors $F_{d,u}^{(l)}$ is identical for all beam indices, but varies over delay and layer indices, $F_{d,u}^{(l)} = F_d^{(l)}, \forall u, d, l$, or the number of Doppler frequency-components $F_{d,u}^{(l)}$ is identical for all beam indices and layer indices, but varies over delay indices, $F_{d,u}^{(l)} = F_d, \forall u, d, l$, or the number of Doppler frequency-components $F_{d,u}^{(l)}$ is different for the U beams, and identical for all delay and layer indices, $F_{d,u}^{(l)} = F_u, \forall u, d, l$, or the number of Doppler-frequency-components $F_{d,u}^{(l)}$ varies over beam and delay indices and is identical for all layer indices, $F_{d,u}^{(l)} = F_{d,u}, \forall u, d, l$, or the number of Doppler frequency-components $F_{d,u}^{(l)}$ varies over beam and layer indices, and is identical for all delay indices, $F_{d,u}^{(l)} = F_u^{(l)}, \forall u, d, l$.

13. The communication device of claim 1, wherein the CSI is represented by a three-dimensional channel tensor $\mathcal{H} \in \mathbb{C}^{N \times S \times T}$ of the dimension N×S×T with S being the number of configured sub-bands/PRBs, or subcarriers, T being the number of time instances during the observation time, and $N = N_r \cdot N_1 \cdot N_2 \cdot P$, and the first, second and third dimensions of the channel tensor representing the space, frequency, and time components of the MIMO channel, respectively, or the CSI is represented by a four-dimensional channel tensor $\mathcal{H} \in \mathbb{C}^{N \times S \times T}$ of dimension $N_r \times N_t \times S \times T$, where $N_t = N_1 \cdot N_2 \cdot P$, the first and second dimensions of $\mathcal{H}$ representing the receive-side and transmit-side space components of the MIMO channel, respectively, and the third and fourth dimensions of $\mathcal{H}$ representing the frequency and time component of the channel, respectively.

14. The communication device of claim 1, wherein the processor is configured to select a Doppler-delay precoder matrix based on a performance metric for e.g., the mutual-information $I(W; \mathcal{H})$, which is a function of the Doppler-delay precoder matrix W and a multi-dimensional channel tensor $\mathcal{H}$.

15. The communication device of claim 14, wherein the processor is configured to select a wideband CQI that optimizes the average block error rate block_error_rate($\mathcal{H} | W^{(l)}$ (l=1, ... L)) at the communication device for the selected composite Doppler-delay-beam precoder matrix $W^{(l)}$ (l=1, ..., L) and a multi-dimensional channel tensor $\mathcal{H}$ for the T time instants.

16. The communication device of claim 1, wherein the processor is configured to use, in a first step, a high resolution parameter estimation algorithm to estimate parameters of a channel model directly from a multi-dimensional channel tensor $\mathcal{H}$, or to calculate the coefficients of H(t, w) directly in a non-parameterized form from the MIMO channel tensor use, in a second step, the parameterized channel model and the selected Doppler-delay-beam composite precoder $W^{(l)}$(l=1, ..., L) to calculate a parameterized precoded MIMO channel model frequency-domain response as $$H_{prec}(t,w) = H(t,w)[W^{(1)}(t,w), W^{(2)}(t,w), \ldots, W^{(L)}(t,w)],$$

where the (i,j) entry of $[H(t,(t, w)]_{i,j} = h_{i,j}(t,w)$, and $W^{(l)}(t, w)$ is the t-th block and w-th column of $W^{(l)}$, use, in a third step, the parameterized precoded MIMO channel model response to calculate one or more CQI values for one or more future time instants.

17. The communication device of claim 1, wherein the processor is configured to predict a CQI value for time-instant/slot n+K, where n denotes the current time-instant/slot, and K denotes the relative time difference with respect to the current time-instant/slot n.

18. The communication device of claim 17, wherein the communication device is configured to receive a CSI reporting configuration comprising a parameter CQI-Prediction-Time assigned with the value K which is used by the communication device for CQI prediction.

19. The communication device of claim 1, wherein, in case the CSI feedback comprises the PMI, the processor is configured to report at least a two-component PMI, where the first PMI indicates the selected vectors $b_u^{(l)}$ and $d_{p,u,d}^{(l)}$, and where the second PMI indicates the beam combining coefficients, from the communication device to the transmitter.

20. The communication device of claim 19, wherein the processor is configured to represent the first-component PMI in the form of three-tuple sets, where each three-tuple (u, d, v) is associated with a selected spatial beam vector $b_u^{(l)}$, a selected delay vector $d_{p,u,d}^{(l)}$, and a selected Doppler-frequency vector $f_{p,u,d,v}^{(l)}$ the three-tuple sets being represented by $i_1 = [i_{1,1}, i_{1,2}, 1_{1,3}]$, where $i_1$ represents the first PMI component, and where $i_{1,1}$ indicates $\Sigma_l U^{(l)}$ indices of the selected DFT-vectors for the spatial beams, $i_{1,2}$ indicates $2\Sigma_{u,l} D_u^{(l)}$ indices of the selected delay-vectors, and $i_{1,3}$ indicates $2\Sigma_{u,d,l} F_{d,u}^{(l)}$ indices of the selected Doppler-frequency-vectors, quantize the Doppler-delay-beam combining coefficients using a codebook approach, where the quantized Doppler-delay-beam combining coefficients are represented by $i_2$, the second PMI component, and report the two PMI components to the transmitter.

21. The communication device of claim 1, wherein, in case the CSI feedback comprises the PMI, the processor is configured to report at least a two-component PMI,
where the first PMI indicates to the selected vectors $b_u^{(l)}$, $d_{p,u,d}^{(l)}$ and $f_{p,u,d,v}^{(l)}$, and
where the second PMI indicates to the combining coefficients, from the communication device to the transmitter.

22. The communication device of claim 1, wherein, in case the CSI feedback comprises the PMI, the processor is configured to report at least a two-component PMI,
where the first PMI indicates to the selected vectors $b_u^{(l)}$, $d_{p,u,d}f_{p,u,d,v}^{(l)}$, and
where the second PMI indicates the $2\Sigma_{u,d,l}F_{d,u}^{(l)}$ Doppler-delay-beam combining coefficients, from the communication device to the transmitter.

23. The communication device of claim 22, wherein the processor is configured to
represent the first-component PMI in the form of three-tuple sets, where each three-tuple (u, d, v) is associated with a selected spatial beam vector $b_u^{(l)}$, a selected delay vector $d_p)_{u,d}$, and a selected Doppler-frequency vector $f_{p,u,d,v}^{(l)}$, the three-tuple sets being represented by $i_1=[i_{1,1}, i_{1,2}, i_{1,3}]$, where $i_1$ represents the first PMI component, and where $i_{1,1}$ indicates indices of the selected DFT-vectors for the spatial beams, $i_{1,2}$ indicates indices of the selected delay-vectors, and $i_{1,3}$ indicates indices of the selected Doppler-frequency-vectors,
quantize the Doppler-delay-beam combining coefficients using a codebook approach, where the quantized Doppler-delay-beam combining coefficients are represented by $i_2$, the second PMI component, and
report the two PMI components to the transmitter.

24. The communication device of claim 1, wherein, for quantizing the complex Doppler-delay coefficients $\gamma_{p,u,d,v}^{(l)}$ with a codebook approach, each coefficient is represented by $$\gamma_{p,u,d,v}^{(l)}=\tilde{\gamma}_{p,u,d,v}^{(l)}\phi_{p,u,d,v}^{(l)},$$

where
$\tilde{\gamma}_{p,u,d,v}^{(l)}$ is a polarization-, beam-, delay- and Doppler-frequency-dependent amplitude coefficient which is quantized with N bits; and
$\phi_{p,u,d,v}^{(l)}$ represents a phase which is represented by a BPSK, or QPSK, or 8PSK, or any other higher-order PSK constellation, or
wherein each coefficient is represented by its real and imaginary part as $$\gamma_{p,u,d,v}^{(l)}=\text{Re}\{\hat{\gamma}_{p,u,d,v}^{(l)}\}+j\cdot\text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{p,u,d,v}^{(l)}\}$ are quantized each with N bits.

25. The communication device of claim 1, wherein the CSI feedback further comprises a rank indicator, RI, and
wherein the processor is configured to report the RI for the transmission, wherein the RI is selected with respect to the Doppler-delay-beam precoder matrix $W^{(l)}$ (l=1, ..., L) and denotes an average number of layers supported by the Doppler-delay-beam precoded MIMO channel.

26. The communication device of claim 1, wherein the communication device is configured with a CSI-RS reporting configuration via a higher layer for reporting either the CQI and/or RI and/or PMI for a beam-formed CSI-RS, the vectors in the first codebook matrix represented by $N_1N_2$-length column vectors, where the m-th vector (m=1, ..., $N_1N_2$) comprises a single 1 at the m-th position and zeros elsewhere.

27. The communication device of claim 1, wherein the communication device is configured to receive a CSI-RS resource configuration comprising a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in.

28. The communication device of claim 1, wherein the communication device assumes that for determining the CQI, and/or RI, and/or PMI calculation, the transmitter applies the Doppler-delay-beam precoder to PDSCH signals on antenna ports {1000,1008+v−1} for v=L layers as $$\begin{bmatrix} y^{(t,3000)}(i) \\ \vdots \\ y^{(t,3000+P-1)}(i) \end{bmatrix} = W(t,i) \begin{bmatrix} x^{(t,0)}(i) \\ \vdots \\ x^{(t,v-1)}(i) \end{bmatrix},$$

where
$[x^{(t,0)}(i), \ldots, x^{(t,v-1)}(i)]^T$ is a symbol vector of PDSCH symbols, $P \in \{1,2, 4, 8, 12, 16, 24, 32\}$,
$x^{(t,u)}(i)$ is the i-th symbol of layer u at time instant t,
$y^{(t,u)}(i)$ is the precoded symbol transmitted on antenna port u at time instant t, and
$W(t,i)=[W^{(1)}(t, i), \ldots, W^{(L)}(t, i)]$ is the predicted precoder matrix, with $W^{(l)}(t,i)$ being the t-th block and i-th column of $W^{(l)}$.

29. The communication device of claim 1, wherein the number of beams $U^{(l)}$ is identical for all layers so that $U^{(l)}=U, \forall l$.

30. The communication device of claim 1, wherein the number of delays $D_u^{(l)}$ depends on the layer index.

31. The communication device of claim 1, wherein the delay components configuration is configured via a higher layer signaling, e.g., RRC or MAC signaling, from the transmitter to the communication device, or wherein the delay configuration is a-priori known by the communication device.

32. The communication device of claim 1, wherein the beam configuration is configured via a higher layer signaling, e.g., RRC or MAC signaling, from the transmitter to the communication device, or wherein the beam configuration is a-priori known by the communication device.

33. The communication device of claim 1, wherein, wherein the Doppler-frequency components configuration is configured via a higher layer signaling, e.g., RRC or MAC signaling, from the transmitter to the communication device, or wherein the Doppler-frequency configuration is a-priori known by the communication device.

34. The communication device of claim 1, wherein the oversampled factors $O_{1,1}$, $O_{1,2}$ and/or $O_2$ and/or $O_3$ of the DFT-based codebook matrices may be known by the communication device.

35. The communication device of claim 1, wherein the communication device selects the channel quality indicator, CQI, for reporting, and, in case CQI reporting is configured at the communication device, the communication device reports an advantageous CQI based on a specific performance metric, such as signal-to-interference and noise ratio (SINR), average bit error rate, average throughput, etc.

36. The communication device of claim 1, wherein the first codebook represents a port selection codebook and each vector of the first codebook comprises a single 1 and zeros elsewhere.

37. The communication device of claim 1, wherein the first codebook represents a port selection codebook and each vector of the first codebook comprises a single 1 and zeros elsewhere.

38. The communication device of claim 1, wherein the Doppler-delay precoder matrix (W) is based on a first codebook for the one or more transmit-side spatial beam components and a second codebook for the one or more delay components of the Doppler-delay precoder matrix.

39. A transmitter in a wireless communication system comprising a communication device, the transmitter comprising:
   an antenna array comprising a plurality of antennas for a wireless communication with one or more communication devices of claim 1 for providing a channel state information, CSI, feedback to the transmitter; and
   a precoder connected to the antenna array, the precoder to apply a set of beamforming weights to one or more antennas of the antenna array to form, by the antenna array, one or more transmit beams or one or more receive beams,
   a transceiver configured to
      transmit, to the communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and
      receive uplink signals comprising a plurality of CSI reports from the communication device; and
   a processor configured to:
      extract at least the two component precoder matrix identifier and the rank indicator from the plurality of CSI reports; and
      construct a Doppler-delay-beam precoder matrix applied on the antenna ports using a first component and a second component of the PMI, and determine the beamforming weights responsive to the constructed precoder matrix.

40. The transmitter of claim 39, wherein, to facilitate precoder matrix prediction for QT future time instants, the processor is configured to cyclically extend the Doppler-frequency DFT-vectors $f_{p,u,d,v}^{(l)}$ to a length-QT vectors $t_{p,u,d,v}^{(l)}$, the cyclic extension defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3$, and the predicted precoder matrix for the l-th layer and q-th (q=1, . . . , QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} t_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} t_{2,u,d,v}^{(l)}(q) \otimes d_{2,u,d}^{(l)T} \otimes b_u^{(l)} \end{bmatrix}$$

where $t_{p,u,d,v}^{(l)}(q)$ is the q-th entry of $t_{p,u,d,v}^{(l)}$.

41. A wireless communication network, comprising:
   at least one communication device for providing a channel state information, CSI, feedback in a wireless communication system, the communication device comprising:
      a transceiver configured to receive, from a transmitter a radio signal via a MIMO channel, the radio signal comprising downlink reference signals according to a reference signal configuration comprising a number of antenna ports, and downlink signals comprising the reference signal configuration; and
      a processor configured to
         estimate an CSI using measurements on the downlink reference signals on the radio channel, the downlink reference signals provided over a certain observation time,
         select, based on a performance metric, a Doppler-delay precoder matrix for a composite Doppler-delay-beam three-stage precoder, the Doppler-delay-beam three-stage precoder being based on one or more codebooks, the one or more codebooks comprising
            one or more transmit-side spatial beam components of the composite Doppler-delay-beam three-stage precoder,
            one or more delay components of the composite Doppler-delay-beam three-stage precoder, and
            one or more Doppler-frequency components of the composite Doppler-delay-beam three-stage precoder,
         determine either one or more of a channel quality indicator, CQI, and/or a precoder matrix indicator, PMI, and/or a rank indicator, RI, using the composite Doppler-delay-beam three-stage precoder with the selected Doppler-delay-beam precoder matrix, and
         report to the transmitter the CSI feedback comprising either one or more of the CQI, and/or the PMI and/or the RI, wherein the PMI and RI are used to indicate the Doppler-delay-beam three-stage composite precoder matrix for the configured antenna ports; and
   at least one transmitter in a wireless communication system comprising a communication device, the transmitter comprising:
      an antenna array comprising a plurality of antennas for a wireless communication with one or more communication devices of claim 1 or claim 39 for providing a channel state information, CSI, feedback to the transmitter; and
      a precoder connected to the antenna array, the precoder to apply a set of beamforming weights to one or more antennas of the antenna array to form, by the antenna array, one or more transmit beams or one or more receive beams,
      a transceiver configured to
         transmit, to the communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and
         receive uplink signals comprising a plurality of CSI reports from the communication device; and a processor configured to:
  extract at least the two component precoder matrix identifier and the rank indicator from the plurality of CSI reports; and
  construct a Doppler-delay-beam precoder matrix applied on the antenna ports using a first component and a second component of the PMI, and determine the beamforming weights responsive to the constructed precoder matrix.

42. The wireless communication network of claim 41, wherein the communication device and the transmitter comprises one or more of:
  a mobile terminal, or
  stationary terminal, or
  cellular IoT-UE, or
  an IoT device, or
  a ground based vehicle, or
  an aerial vehicle, or
  a drone, or
  a moving base station, or
  road side unit, or
  a building, or
  a macro cell base station, or
  a small cell base station, or
  a road side unit, or
  a UE, or
  a remote radio head, or
  an AMF, or
  an SMF, or
  a core network entity, or
  a network slice as in the NR or 5G core context, or
  any transmission/reception point (TRP) enabling an item or a device to communicate using the wireless communication network, the item or device being provided with network connectivity to communicate using the wireless communication network.

43. A method for providing a channel state information, CSI, feedback in a wireless communication system, the method comprising:
  receiving, from a transmitter, a radio signal via a MIMO channel, the radio signal comprising downlink reference signals according to a reference signal configuration comprising a number of antenna ports, and downlink signals comprising the reference signal configuration;
  estimating, at the communication device, an CSI using measurements on the downlink reference signals on the radio channel, the downlink reference signals provided over a certain observation time,
  based on a performance metric, selecting, at the communication device, a Doppler-delay precoder matrix for a composite Doppler-delay-beam three-stage precoder, the Doppler-delay-beam three-stage precoder being based on one or more codebooks, the one or more codebooks comprising
    one or more transmit-side spatial beam components of the composite Doppler-delay-beam three-stage precoder,
    one or more delay components of the composite Doppler-delay-beam three-stage precoder, and
    one or more Doppler-frequency components of the composite Doppler-delay-beam three-stage precoder,
  determining, at the communication device, one or more of a channel quality indicator, CQI, a precoder matrix indicator, PMI, and a rank indicator, RI, using the composite Doppler-delay-beam three-stage precoder with the selected Doppler-delay-beam precoder matrix, and
  reporting from the communication device to the transmitter the CSI feedback comprising one or more of the CQI, the PMI and the RI, wherein the PMI and RI are used to indicate the Doppler-delay-beam three-stage composite precoder matrix for the configured antenna ports.

44. A method for transmitting in a wireless communication system comprising a communication device and a transmitter, the method comprising:
  transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;
  receiving, at the transmitter, uplink signals comprising a plurality of CSI reports from the communication device;
  extracting, at the transmitter, at least the two component precoder matrix identifier and the rank indicator from the plurality of CSI reports;
  constructing, at the transmitter, a Doppler-delay-beam precoder matrix applied on the antenna ports using a first component and a second component of the PMI, and
  determining, responsive to the constructed precoder matrix, beamforming weights for a precoder connected to an the antenna array of the transmitter.

45. Non-transitory digital storage medium having a computer program stored thereon to perform the method for providing a channel state information, CSI, feedback in a wireless communication system, said method comprising:
  receiving, from a transmitter, a radio signal via a MIMO channel, the radio signal comprising downlink reference signals according to a reference signal configuration comprising a number of antenna ports, and downlink signals comprising the reference signal configuration;
  estimating, at the communication device, an CSI using measurements on the downlink reference signals on the radio channel, the downlink reference signals provided over a certain observation time,
  based on a performance metric, selecting, at the communication device, a Doppler-delay precoder matrix for a composite Doppler-delay-beam three-stage precoder, the Doppler-delay-beam three-stage precoder being based on one or more codebooks, the one or more codebooks comprising
    one or more transmit-side spatial beam components of the composite Doppler-delay-beam three-stage precoder,
    one or more delay components of the composite Doppler-delay-beam three-stage precoder, and
    one or more Doppler-frequency components of the composite Doppler-delay-beam three-stage precoder,
  determining, at the communication device, one or more of a channel quality indicator, CQI, a precoder matrix indicator, PMI, and a rank indicator, RI, using the composite Doppler-delay-beam three-stage precoder with the selected Doppler-delay-beam precoder matrix, and reporting from the communication device to the transmitter the CSI feedback comprising one or more of the CQI, the PMI and the RI, wherein the PMI and RI are used to indicate the Doppler-delay-beam three-stage composite precoder matrix for the configured antenna ports, when said computer program is run by a computer.

46. Non-transitory digital storage medium having a computer program stored thereon to perform the method for transmitting in a wireless communication system comprising a communication device and a transmitter, said method comprising:

transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;

receiving, at the transmitter, uplink signals comprising a plurality of CSI reports from the communication device;

extracting, at the transmitter, at least the two component precoder matrix identifier and the rank indicator from the plurality of CSI reports;

constructing, at the transmitter, a Doppler-delay-beam precoder matrix applied on the antenna ports using a first component and a second component of the PMI, and determining, responsive to the constructed precoder matrix, beamforming weights for a precoder connected to an the antenna array of the transmitter, when said computer program is run by a computer.

* * * * *

UNITED STATES PATENT AND TRADEMARK OFFICE
CERTIFICATE OF CORRECTION

PATENT NO. : 11,616,551 B2
APPLICATION NO. : 17/098592
DATED : March 28, 2023
INVENTOR(S) : Marcus Großmann et al.

Page 1 of 1

It is certified that error appears in the above-identified patent and that said Letters Patent is hereby corrected as shown below:

In the Claims

In Column 39 (Claim 13), Line 59: please delete "N×N×S×T" and insert --$N_r x N_t x S x T$--.

In Column 48 (Claim 46), Line 17: immediately following "an", please delete "the".

Signed and Sealed this
First Day of October, 2024

Katherine Kelly Vidal
*Director of the United States Patent and Trademark Office*